United States Patent
Yamamoto

(10) Patent No.: US 7,746,501 B2
(45) Date of Patent: Jun. 29, 2010

(54) METHOD AND DEVICE FOR COMPRESSING IMAGE DATA

(75) Inventor: Toshitsugu Yamamoto, Takatsuki (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 1001 days.

(21) Appl. No.: 11/483,513

(22) Filed: Jul. 10, 2006

(65) Prior Publication Data

US 2007/0013953 A1 Jan. 18, 2007

(30) Foreign Application Priority Data

| Jul. 13, 2005 | (JP) | ............................ 2005-204842 |
| Apr. 12, 2006 | (JP) | ............................ 2006-110270 |
| May 15, 2006 | (JP) | ............................ 2006-135538 |

(51) Int. Cl.
*H04N 1/405* (2006.01)

(52) U.S. Cl. ...................... 358/3.1; 358/3.13; 358/3.19; 382/270; 382/273

(58) Field of Classification Search ........................ None
See application file for complete search history.

(56) References Cited

U.S. PATENT DOCUMENTS

| 4,862,261 A | * | 8/1989 | Tanaka ..................... 348/422.1 |
| 5,896,137 A | * | 4/1999 | Ito et al. ..................... 345/619 |
| 5,953,459 A | * | 9/1999 | Ueda et al. .................. 382/237 |
| 6,201,614 B1 | | 3/2001 | Lin ............................ 358/1.9 |
| 6,597,811 B1 | * | 7/2003 | Batkilim et al. ............. 382/232 |
| 6,731,800 B1 | * | 5/2004 | Barthel et al. ............... 382/176 |
| 6,836,346 B2 | * | 12/2004 | Yoshizawa et al. ........... 358/1.9 |
| 7,298,894 B2 | * | 11/2007 | Chen .......................... 382/167 |
| 7,379,624 B2 | * | 5/2008 | Hoshi ........................ 382/299 |
| 7,466,451 B2 | * | 12/2008 | Kobayashi .................. 358/1.9 |
| 7,508,550 B2 | * | 3/2009 | Kameyama ................ 358/3.23 |
| 7,532,362 B2 | * | 5/2009 | Fujimori .................... 358/3.06 |
| 7,580,156 B2 | * | 8/2009 | Kakutani .................... 358/3.13 |
| 2005/0117928 A1 | * | 6/2005 | Hino ........................... 399/49 |
| 2005/0123206 A1 | * | 6/2005 | Sakai et al. ................. 382/238 |
| 2006/0158691 A1 | * | 7/2006 | Kakutani .................... 358/3.01 |
| 2006/0285165 A1 | * | 12/2006 | Kakutani .................... 358/3.06 |

FOREIGN PATENT DOCUMENTS

JP 6-152986 5/1994

* cited by examiner

*Primary Examiner*—Mark K Zimmerman
*Assistant Examiner*—Dung D Tran
(74) *Attorney, Agent, or Firm*—Sidney Austin LLP

(57) ABSTRACT

A method for compressing image data includes a first step for dividing image data into predetermined areas and determining a representative value about density of pixels in each area, a second step for determining density of pixels included in each area by using the representative value of the area and an interpolation rule, a third step for determining reproducibility of an image obtained, on the basis of the density of pixels determined in the second step, by using the image data and a dither pattern that is used for a pseudo gradation process performed on the image data, and a fourth step for encoding, on the basis of the representative value determined in the first step, for areas that are determined to have a good reproducibility in the third step.

20 Claims, 31 Drawing Sheets

| DEFINED AREA | TL1 | TL2 | TL3 | TL4 | | | TL5 | TL6 | TL7 | | | TL8 | ... |
|---|---|---|---|---|---|---|---|---|---|---|---|---|---|
| NUMBER OF BITS | 7 | 7 | 7 | 7 | 7 | 64 | 7 | 7 | 7 | 7 | 64 | 7 | ... |
| MODEL DATA | 28 | 28 | 30 | F | 28 | D | 40 | 42 | F | 41 | D | 39 | ... |
| | AP | AP | AP | AF | AP | AR | | | | | AN | | |

TLx  TLy  TLx  TLy ...

| DIFFERENCE OF REPRESENTATIVE VALUE | CODE | NUMBER OF ADDITIONAL BITS |
|---|---|---|
| 0 | 00 | 0 |
| −1,1 | 010 | 1 |
| −3,−2,2,3 | 011 | 2 |
| −7,−6,−5,−4,4,5,6,7, | 100 | 3 |
| −15,⋯−8,8,⋯15 | 101 | 4 |
| −32,⋯−16,16,⋯32 | 110 | 6 |
| SWITCHING FLAG | 111 | 0 |

| NUMBER OF MISMATCHING DOTS | NUMBER OF AREAS |
|---|---|
| 0 | 21781 |
| 1 | 9720 |
| 2 | 4413 |
| ⋮ | ⋮ |

FIG. 28
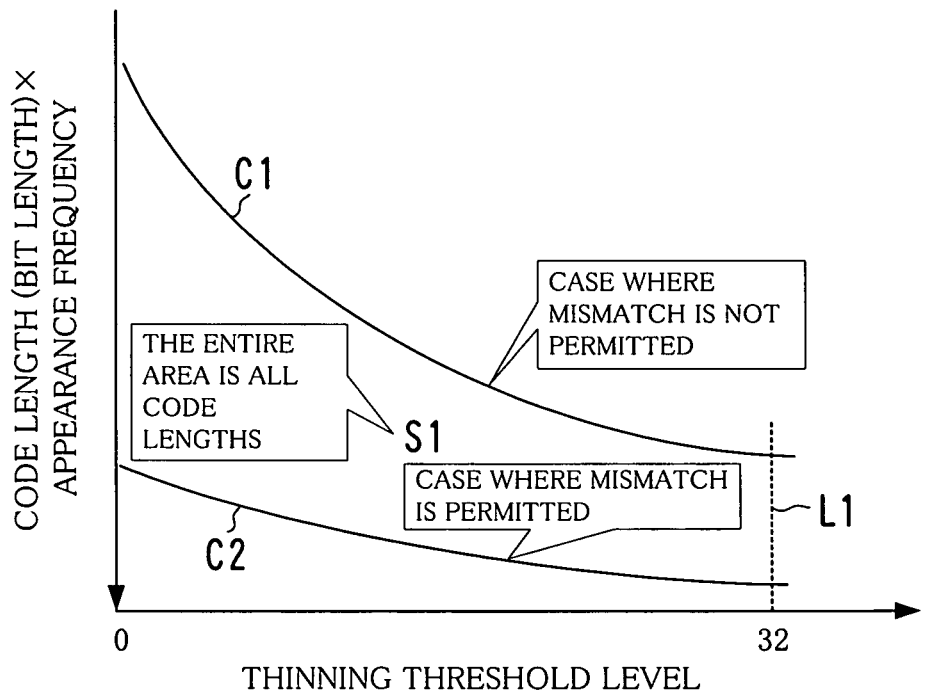
(a)
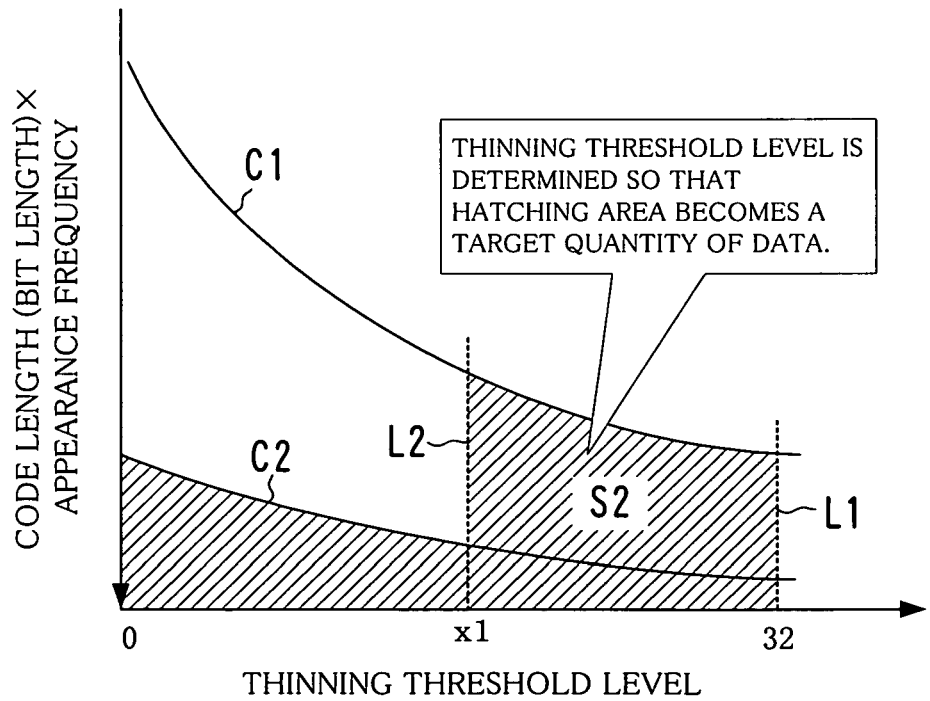
(b)

METHOD AND DEVICE FOR COMPRESSING IMAGE DATA

This application is based on Japanese Patent Application Nos. 2005-204842, 2006-110270 and 2006-135538 filed on Jul. 13, 2005, Apr. 12, 2006 and May 15, 2006, respectively, the contents of which are hereby incorporated by reference.

BACKGROUND OF THE INVENTION

1. Field of the Invention

The present invention relates to a method and a device for compressing image data having a gradation property.

2. Description of the Prior Art

In general, a print system including a computer and a printer is used. As such a print system, there is a type in which a computer side performs an image processing such as a pseudo gradation process (a dither process) on image data to be printed so that a printer side does not need to perform a special process on the image data received from the computer and prints the image on a paper sheet just by using the image data.

Conventionally, a raster printer is known as a printer that is used for this type of print system. The raster printer can be made up of small scale hardware at a low cost since the printer side does not need to perform a special image processing. However, it has a disadvantage that a quantity of data to be transmitted increases since image data that can be printed on a paper sheet as they are should be transmitted. In addition, a recent request for a high quality of image makes image data have more volume size resulting in a greater quantity of data to be transmitted to the printer. For this reason, the transmission of image data from the computer to the printer needs much time.

In order to solve this problem, the computer side has to compress the image data. However, if a process for compression is complicated, the compression process itself needs much time. Furthermore, there is a case where an expansion process also needs much time if the expansion process is complicated. In this case, the printer side requires at large scale hardware for the expansion process at a high cost.

Therefore, it is desired to realize a compression technique that can perform compression with a small process load by small scale hardware to realize a high compressibility so as to realize a print system that can use an inexpensive printer and perform a high speed process as a whole.

In many cases, image data must be processed to have a pseudo gradation when the image data with a multi gradation is printed with a printer. As one of methods for realizing a pseudo gradation, a dither method is known well conventionally. The dither method uses a dither pattern and compares each of threshold levels of the dither pattern with a pixel value of each pixel of the image data so as to produce binary data or multivalued data.

One of compression techniques on the basis of the dither pattern is disclosed in Japanese unexamined patent publication No. 6-152986. According to the method disclosed in this document, binary image data are divided into blocks having a predetermined size. A reference pattern corresponding to the number of dots included in an arbitrary image block is compared with the image block. If the image block matches the reference pattern, it is assigned with a sign indicating the reference pattern. If the image block does not match the reference pattern, a result of the comparison is encoded.

In addition, as a compression technique for binary image data, a JBIG format is known, which is acknowledged by ITU-T recommendation (ITU represents International Telecommunications Union).

In addition, a method for compressing image data having a pseudo gradation produced by a dither pattern is disclosed in U.S. Pat. No. 6,201,614. According to the method disclosed in this document, a value of each pixel is compared with a threshold value so as to determine a range for each pixel.

However, in the method disclosed in the above-mentioned first document, the reference pattern is encoded when a designated image block matches the reference pattern. Therefore, a quantity of data to be transmitted increases corresponding to a sign of the reference pattern. In addition, as image data alter, it is rare that every pixel within a block matches. In this case, the quantity of data is further increased since differential data are transmitted.

On the contrary, the JBIG format has a relatively light load of a compression process, which can be performed at a high speed even on a computer. However, a compressibility of the JBIG format is not so high as a compressibility of other format such as the LZS format or the LZW format. In particular, when halftone data increases, the compressibility of the JBIG format decreases.

As to the method disclosed in the above-mentioned second document, a quantity of information is not decreased since a value is determined for each pixel. Therefore, another compression means are necessary for decreasing a quantity of information.

In either case of the conventional methods, when a gradation image is transmitted to a printer, image data having a pseudo gradation are compressed before transmission, or a gradation image before being processed to have a pseudo gradation is compressed before transmission. In the former case where the pseudo gradation image is compressed, a process becomes complicated because it includes a statistical process of data having a pseudo gradation image component, so there may be a limit in image components that can be extracted. In the latter case where the gradation image is compressed, it is not compatible to have both a high compressibility and a high image quality since components to be transmitted may include a component that will be omitted in the pseudo gradation process that will be performed later.

SUMMARY OF THE INVENTION

An object of the present invention is to provide a method and a device for, in the case of transmission of a gradation image to a printer, compressing image data at a high compressibility while maintaining a high image quality by checking whether or not an image quality of the compressed image is maintained when the image data are compressed.

A compression method according to one aspect of the present invention is a method for compressing image data having a gradation property. The method includes a first step for dividing the image data into predetermined areas, so as to determine a representative value of densities of pixels in each area, a second step for determining a density of each pixel included in the area using the representative value of the area and an interpolation rule, a third step for testing reproducibility of an image obtained on the basis of the density of each pixel determined in the second step, by using the image data and a dither pattern that is used for a pseudo gradation step performed on the image data, and a fourth step for performing an encoding process on the basis of the representative value determined in the first step for areas where the reproducibility was good in the test of the third step.

Preferably, the image obtained on the basis of the density of each pixel is a pseudo gradation image that is obtained by performing a pseudo gradation process on the virtual gradation image on the basis of the density of each pixel using the dither pattern. In addition, the representative value is a density value of a specific pixel in the area, an intermediate value of density values of a plurality of pixels in the area or an intermediate value of density values of a specific pixel and pixels surrounding the specific pixel in the area. In addition, the representative value is a value between a minimum value K of a threshold value in the case where a threshold value of the dither pattern is larger than a density value of the image data and a maximum value J of a threshold value in the case where a threshold value of the dither pattern is smaller than a density value of the image data.

The interpolation rule can be a process in which the density value of each pixel included in the area is equal to the representative value of the area or a process of obtaining the density value of each pixel included in the area by interpolation using a representative value of the area and representative values of one or more neighboring areas of the area.

According to the present invention, a compressing process with high compressibility can be realized while maintaining image quality by checking whether or not the image quality of the compressed image is maintained in the case where a gradation image is sent to a printer.

BRIEF DESCRIPTION OF THE DRAWINGS

FIG. 24 is a diagram showing an example of model data in the second example.

FIG. 25 is a diagram showing an example of a code table about a difference of the representative value.

FIG. 27 is a diagram showing an example of statistical data.

FIGS. 28(a) and 28(b) are diagrams showing a relationship between a thinning threshold level and a quantity of the compressed data.

DESCRIPTION OF THE PREFERRED EMBODIMENTS

Hereinafter, the present invention will be explained more in detail with reference to embodiments and drawings.

[General Structure of System]

Figure 1:
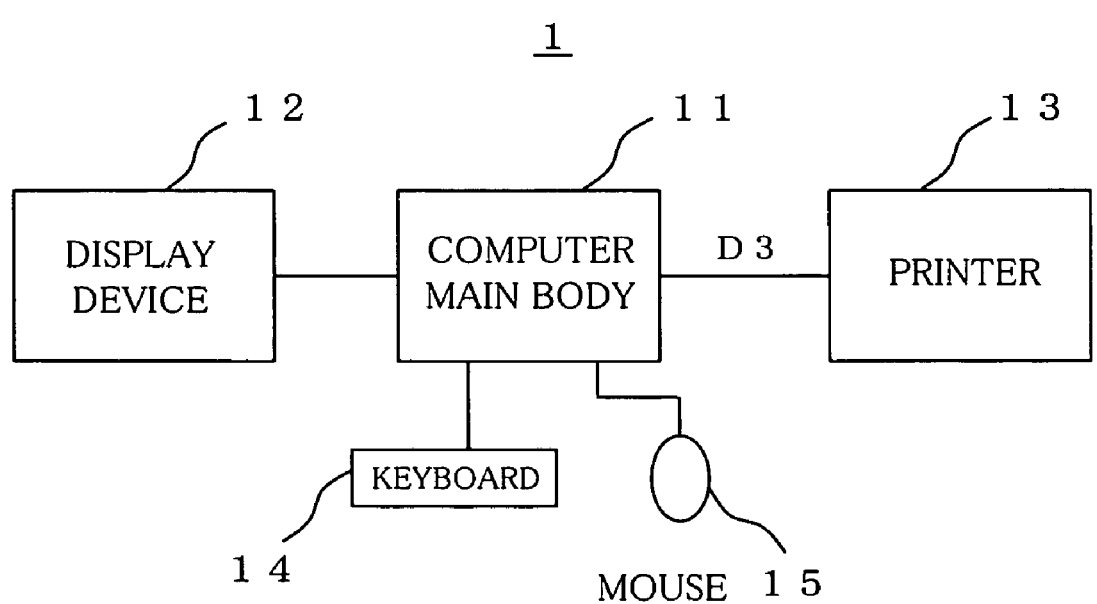
FIG. 1 is a diagram showing a general structure of a print system according to the present invention.
Figure 2:
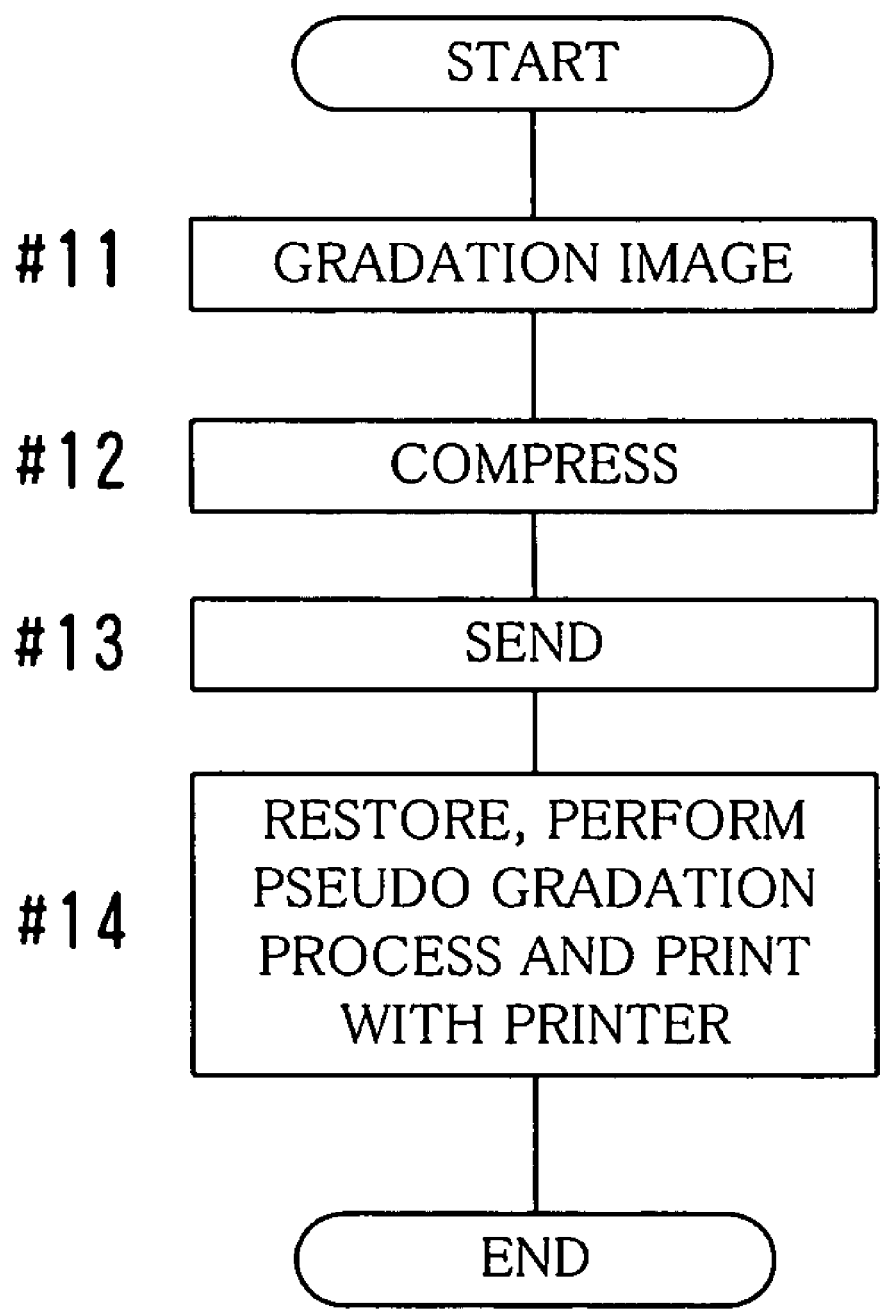
FIG. 2 is a flowchart showing a flow of image data in the print system.

FIG. 1 is a diagram showing a general structure of a print system 1, to which a method for compressing image data according to the present invention is applied, and FIG. 2 is a flowchart showing a flow of image data in the print system 1 in outline.

Note that when referring to "image data", "gradation image data", "pseudo gradation image data" or the like hereinafter, "data" may be omitted and they may be referred to as "image", "gradation image", "pseudo gradation image" or the like.

As shown in FIG. 1, the print system 1 is made up of a computer main body 11, a display device 12, a printer 13, a keyboard 14, a mouse 15 and the like.

The computer main body 11 compresses image data (original image data) supplied externally or generated internally and transmits the compressed data to the printer 13. The image data FD are gradation image data of R, G and B colors or C, M and Y colors having a 256-step gradation, for example.

More specifically, as shown in FIG. 2, the computer main body 11 performs compression process on a target gradation image (#11), so that the compressed data are generated (#12), and the compressed data are sent to the printer 13 (#13). The printer 13 restores the compressed data, performs a pseudo gradation process on the restored data and performs printing (#14). In this way, the printer 13 performs printing usually after restoring the compressed data and performing a pseudo gradation process on the restored data, i.e., converting into a binary image or a multivalued image. As a method for compressing in the step #12, a compression method using a representative value (a representative value compression method) that will be described below is adopted in this embodiment. However, it is possible to adopt other compression method like a compression method using a discrete cosine transformation such as JPEG by using parameters having various characteristic as the representative value.

In this embodiment, the compression process is performed on the image data FD in accordance with the following procedure.

(1) The image data FD is divided into predetermined areas (blocks), and a representative value of density of pixels in each area is determined (a first step). Note that the representative value may be denoted by "a" or "AP".

(2) The representative value in this area and an interpolation rule are used for each area so that density of pixels included in this area is determined (a second step).

(3) Using the image data FD and a dither pattern DP that is used for making pseudo gradations of the image data FD, reproducibility of the image that is obtained in accordance with the density of pixels in the second step is tested to be good or not good (a third step).

(4) An encoding process on the basis of the representative value obtained in the first step is performed for an area in which a good reproducibility is obtained by the test in the third step (a fourth step).

The pseudo gradation process is also called a halftone process. The image having a pseudo gradation is called a pseudo gradation image or a halftone image. As the pseudo gradation process, a multivalued process such as a binary process or a four-value process is performed. In this embodiment, a dither pattern DP is used for determining a representative value "a" that can produce a necessary pseudo gradation image. When the representative value "a" is determined and is used instead of the gradation image, a substantial data compression is realized. The determined representative value "a" is encoded by various methods. Compressed data D2 obtained by encoding compression are sent to the printer 13. The printer 13 restores the received compressed data D2 to a binary image or a multivalued image (a halftone image) by referring to the dither pattern DP or the like that was used for determining the representative value "a", so as to print the image on a paper sheet or the like.

In the compression process of this embodiment, the pseudo gradation image is divided into a dither pattern information component and an image information component. Then, only the image information component is extracted so that the compressed data D2 are obtained after performing the encoding process by the Huffman method. The dither pattern information component is not included in the compressed data D2. In the conventional method, the compression process is performed on both the dither pattern information component and the image information component.

In other words, as a result of analyzing the pseudo gradation process, a resolution component is removed by the pseudo gradation process particularly in a halftone. Since the data that will be removed are not necessary, it can be omitted. Actually, if image data of 600 dpi are converted into data with a pseudo gradation, only a resolution of approximately a tenth (60 dpi) is actually reproduced in many parts having a halftone. If a resolution of this part can be reduced to a tenth, the image data can be reduced to a hundredth. However, if the resolution is reduced to a tenth simply, the image quality will be decreased. If it is possible to separate parts in which the image quality will not be reduced even if the resolution is reduced from parts in which the image quality will be reduced, a necessary quantity of information will be reduced substantially without decreasing the image quality by reducing the resolution as necessity. As to the parts in which the resolution was not reduced, (1) image data after the pseudo gradation process is transmitted, or (2) differential data from image after reducing the resolution is transmitted, or (3) another trial is performed with a resolution higher than the last time. If an image having a high contrast such as a character is mixed, the above-mentioned method (1) should be adopted for a high compression. If a gradation image is mainly handled, the above-mentioned method (2) should be adopted for a high compression.

In order to obtain a pseudo gradation image that is necessary for printing by the printer 13, the image data are converted into data having a pseudo gradation by using the dither pattern DP for the parts in which the resolution was reduced. As to the parts in which the resolution was not reduced, the pseudo gradation image is obtained by an operation opposite to the compression process, respectively.

In this embodiment, a tentative representative value is determined for a noted area that is one of defined areas in the compression process. By using the determined tentative representative value or by using the same value and representative values of one or more areas neighboring the noted area, a density of each pixel in the noted area is determined by interpolation in accordance with a predetermined interpolation rule. If the pseudo gradation image in the noted area is reproduced in the case where the pseudo gradation process was performed by using the dither pattern, the tentative representative value is determined to be a true representative value "a" in the noted area. If the pseudo gradation image in the noted area is not reproduced, the representative value is determined in accordance with a predetermined rule. For example, a tentative representative value corresponding to the highest reproducibility is determined to be a true representative value "a".

The next noted area is an area neighboring the area in which the representative value "a" was determined, and the noted area is moved sequentially so that the representative value "a" is determined for every area. The area that is determined to be the first noted area has no area where the representative value "a" was already determined. Therefore, the representative value "a" is determined for the area by considering a density value of a pixel that is positioned at a periphery or an end portion, particularly at an apex in the noted area.

There are various methods for determining the representative value (the tentative representative value) in the first step as the following examples.

(1) A density value of a specific pixel in the area is used as the representative value.

(2) An intermediate value between density values of a plurality of pixels in the area is used as the representative value. In this case, a mean value, a weighted mean value or a mean square value can be used instead. Alternatively, an average or the like of values except for singular points may be determined and used.

(3) An intermediate value between density values of pixels in a periphery including a specific pixel in the area is used as the representative value.

(4) A value between the minimum value K of the threshold value in the case where the threshold value of the dither pattern is larger than the density value of the image data FD and the maximum value J of the threshold value in the case where the threshold value of the dither pattern DP is smaller than the density value of the image data FD is used as the representative value.

Further, in the second step, the representative value is used for determining a density of each pixel in the area. There are various rules or processes as the interpolation rule HR that is used for the determination as the following examples.

(1) A density value of each pixel included in the area shall be equal to a representative value in the area.

(2) The representative value in the area and representative values in one or more areas neighboring the area are used for the interpolation of the densities of pixels included in the area.

(3) A density of each pixel is determined by interpolation using a plane defined by total three representative values including the representative value in the area and representative values in two areas neighboring the noted area.

(4) A density of each pixel is determined by interpolation using a curved plane (a torsion plane) defined by total four representative values including the representative value in the area and representative values in three areas neighboring the area.

(5) A density of each pixel is determined by interpolation (spline interpolation) using a spline curved plane defined by the representative value in the area and representative values in a plurality of areas neighboring the area. In addition, a polynomial interpolation may be adopted instead of the spline interpolation.

When these interpolation rules HR are indicated, the number thereof may be added as a suffix like "interpolation rule HR1", for example.

Methods for expressing the interpolation rule HR include a method of expressing by a text and a method of expressing by an interpolation equation, an interpolation table or the like. Note that it is possible to determine the interpolation rule HR in common in advance as a precondition for the compression process or the reconstruction process. It is also possible to perform the compression process by using the interpolation rules HR that are different in accordance with types of the original image data or the like and to inform the side performing the reconstruction process of the interpolation rule HR that was used for the compression process. More specifically, the interpolation rule HR can be made up of a process circuit, a program or a conversion table, for example.

Further, in the third step, it is tested (checked) whether reproducibility of the image is good or not. On this occasion, for example, a pseudo gradation image D1 of the image data FD obtained by using the dither pattern DP is compared with a pseudo gradation image D1K that is obtained by performing the pseudo gradation process on virtual gradation image on the basis of a density of each pixel in the area by using the dither pattern DP. Then, it is determined whether or not an error between them is within a predetermined error range.

For this error range, for example, a ratio of the number of pixels in which two pseudo gradation images are not the same to the total number of pixels, the number of pixels in which two pseudo gradation images are not the same (the number of mismatching dots) or the like is used as a threshold value for the determination. Then, for example, an error range in the case where the image data FD are character image data is set to a smaller value than an error range in the case where the image data FD are picture image data. For example, a ratio of the number of mismatch pixels to the total number of pixels is used as the threshold value. It is selected from a range of approximately 15-50% in the case of the picture image, or a range of approximately 5-15% in the case of the character image. Furthermore, if it is necessary that two pseudo gradation images match each other completely, i.e., if no error is permitted, the threshold value should be set to "0". On the contrary, if it is necessary to increase the compressibility, the threshold value should be set to a larger value.

In the case of a picture image, the picture can be seen with a resolution of approximately 100 dpi. However, in the case of a character image, the character can be recognized as a different character if the character has an upstroke portion or a downstroke portion and has some missing dots. Therefore, a requirement for the resolution is stricter to a character image than to a picture image.

When the pseudo gradation process is performed, a plurality of dither patterns may be used selectively in accordance with a type of the area, e.g., a character area or an image area.

In addition, the encoding process is performed in the fourth step for the area in which the reproducibility was good in accordance with the determined representative value. The encoding process for the area in which the reproducibility was not good is performed in accordance with other data, e.g., the image data FD in the area.

Although the representative value can be encoded without any treatment, it is possible instead to determine a difference value between representative values in neighboring areas so that the compressed data D2 are obtained by encoding the determined difference value. Thus, the compressibility can be further improved.

In this way, when the computer main body 11 uses the representative value obtained for each area, the compressed data D2 are generated by using the representative value if the reproducibility of the original image data FD is good. However, if the reproducibility is not good, the compressed data D2 are generated by using not the representative value but other image data having a good reproducibility. Thus, a quantity of data to be sent to the printer 13 can be reduced without decreasing image quality.

With reference to FIG. 1 again, the computer main body 11 sends the obtained compressed data D2 to the printer 13. The computer main body 11 also transmits in advance information about the dither pattern and a decode table DC that is a table for the reconstruction (decode) by the Huffman method to the printer 13. The above-mentioned interpolation rule HR for determining a density of each pixel in each area by interpolation is also sent in advance to the printer 13 if necessary.

The printer 13 obtains a representative value "a" of each area from the compressed data D2 sent from the computer main body 11, determines a density of each pixel in the noted area by interpolation in accordance with a predetermined interpolation rule HR. Thus, the printer 13 obtains the virtual gradation image, which is processed to have a pseudo gradation by using a dither pattern so that the pseudo gradation image D1 is restored.

A personal computer, a workstation or other various computers may be used as the computer main body 11, while a raster printer, a GDI printer or other various printers may be used as the printer 13.

[First Example]

Next, a first example of the compression process performed by the computer main body 11 will be described. Note that this example corresponds to claim 1 through claim 18 in the attached claims.

Figure 3:
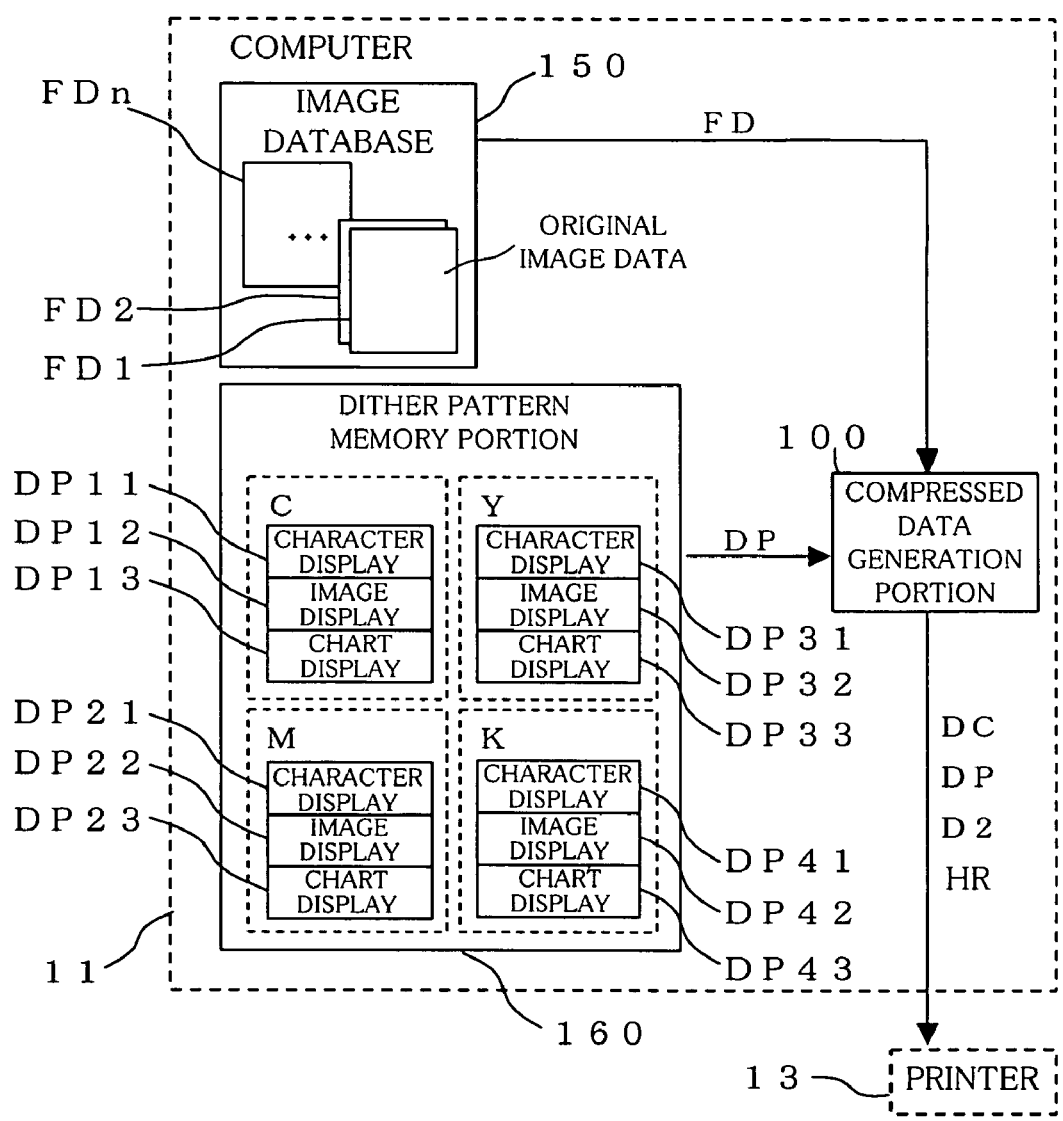
FIG. 3 is a block diagram showing a functional structure of a computer main body.
Figure 4:
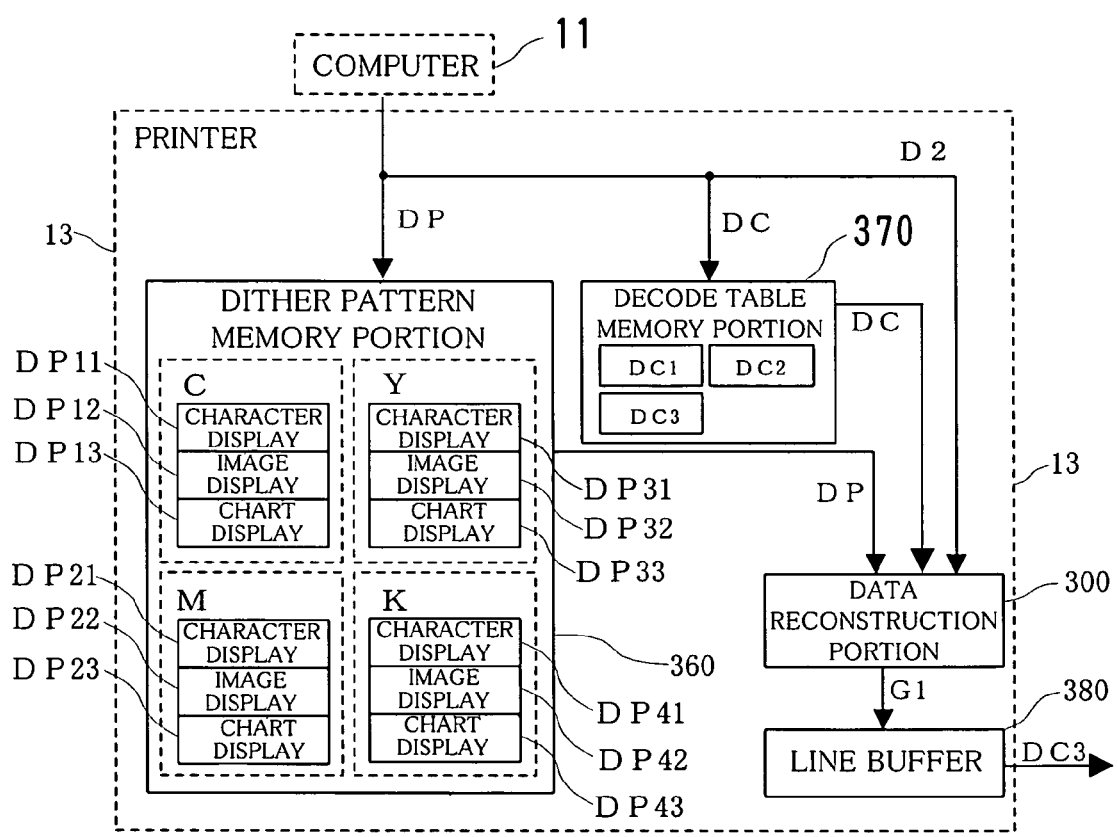
FIG. 4 is a block diagram showing a functional structure of a printer.
Figure 5:
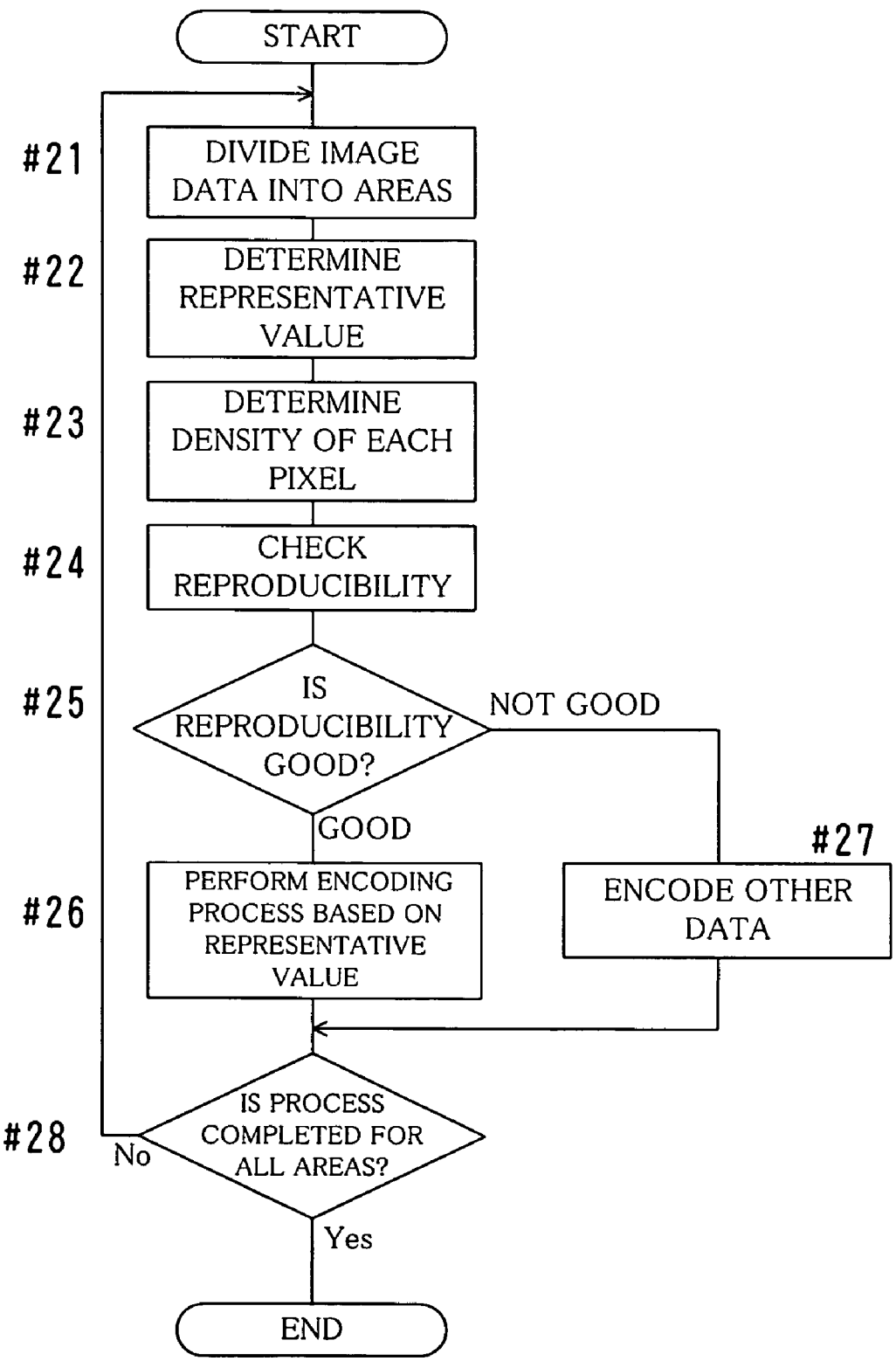
FIG. 5 is a general flowchart showing a compression process performed by the computer main body.
Figure 6:
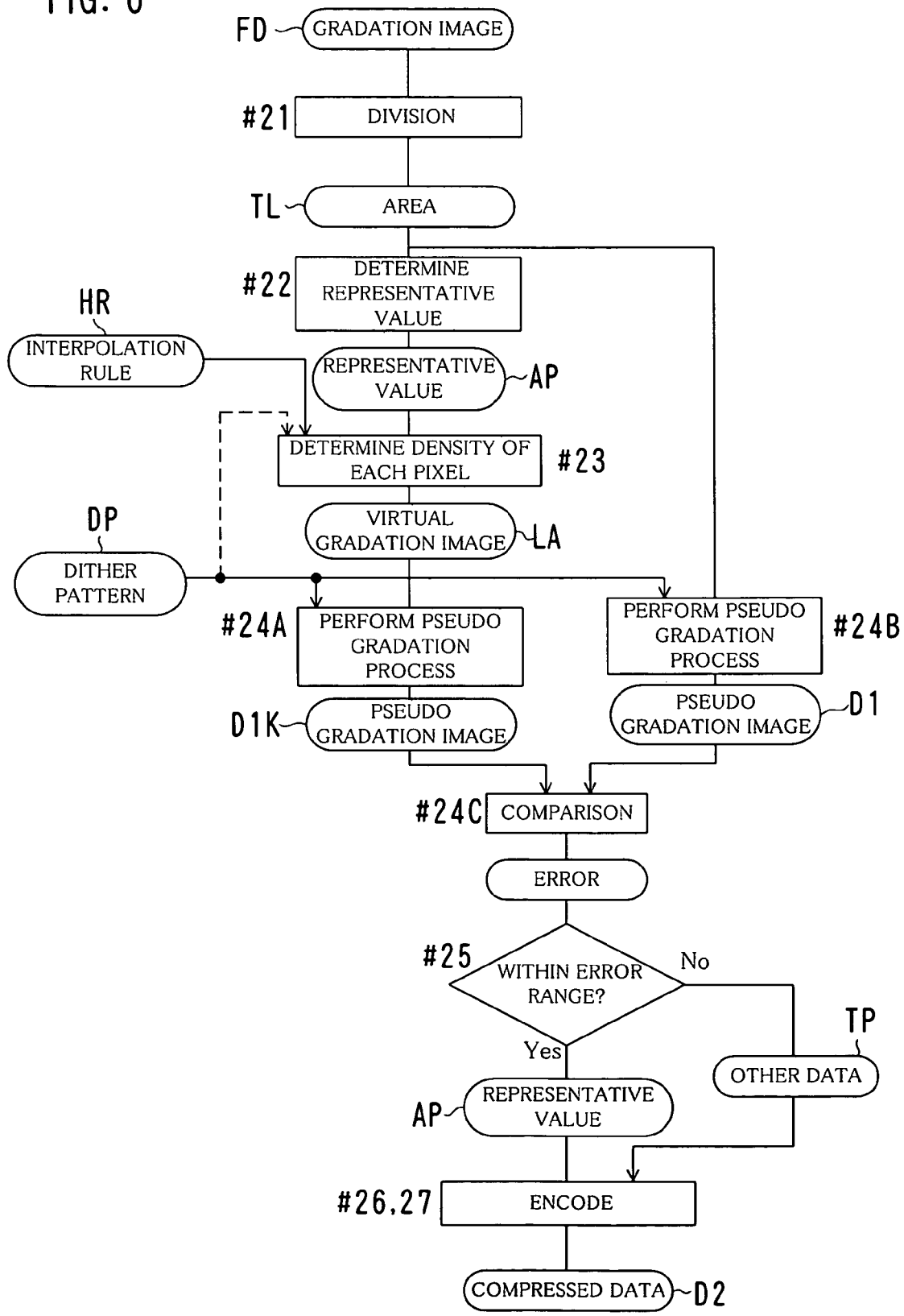
FIG. 6 is a block diagram showing a function of a compressed data generation portion of the computer main body.
Figure 7:
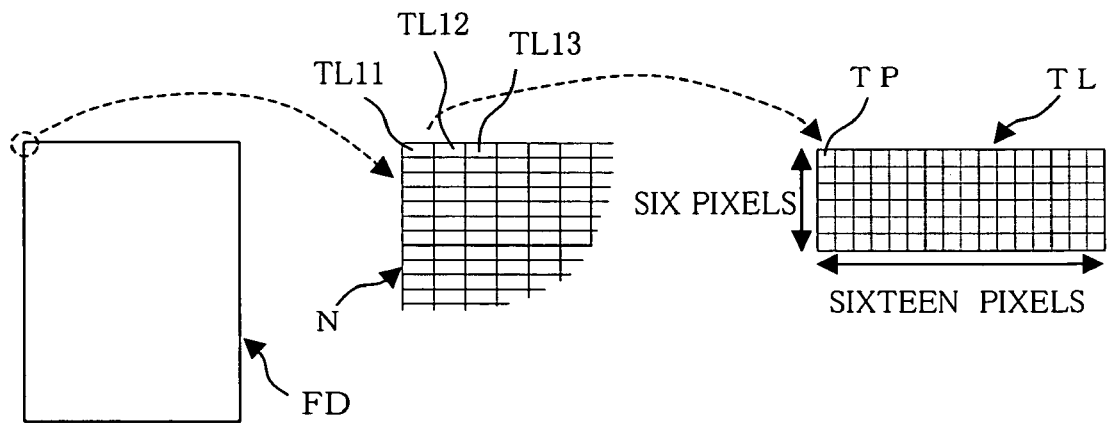
FIG. 7 is a diagram for explaining a defined area.
Figure 8:
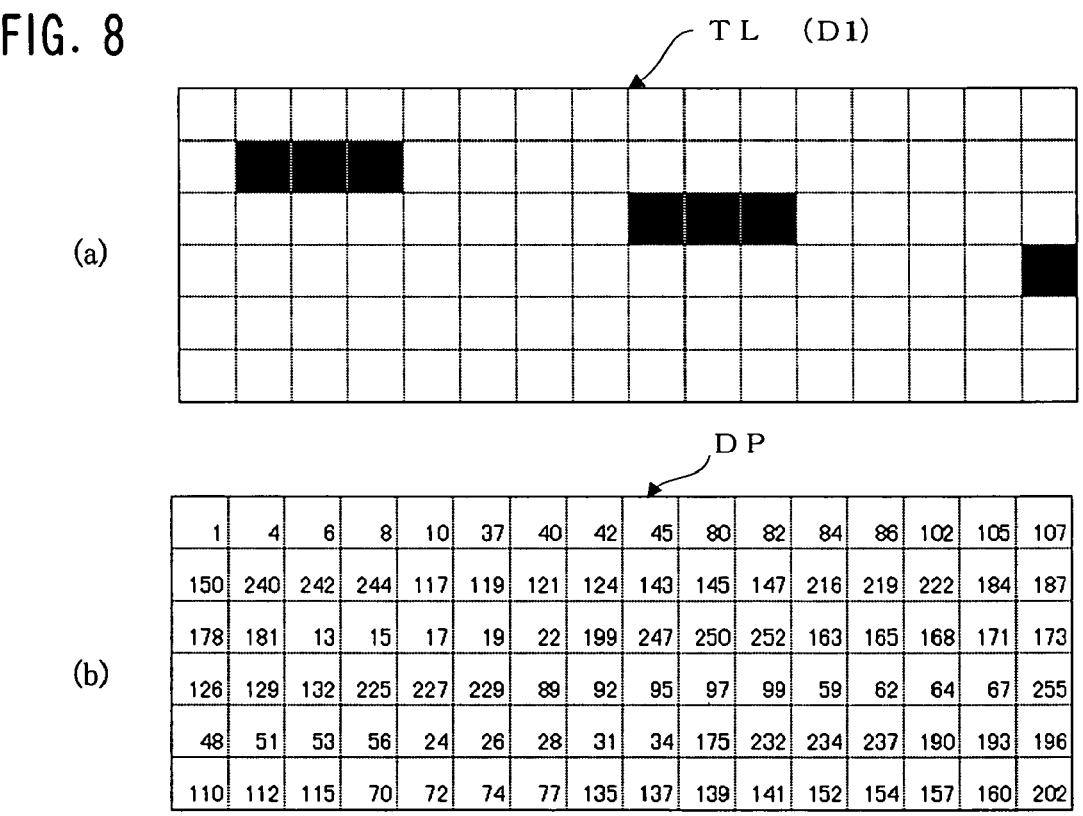
FIGS. 8(a) and 8(b) are diagrams showing examples of an area and a dither pattern.
Figure 9:
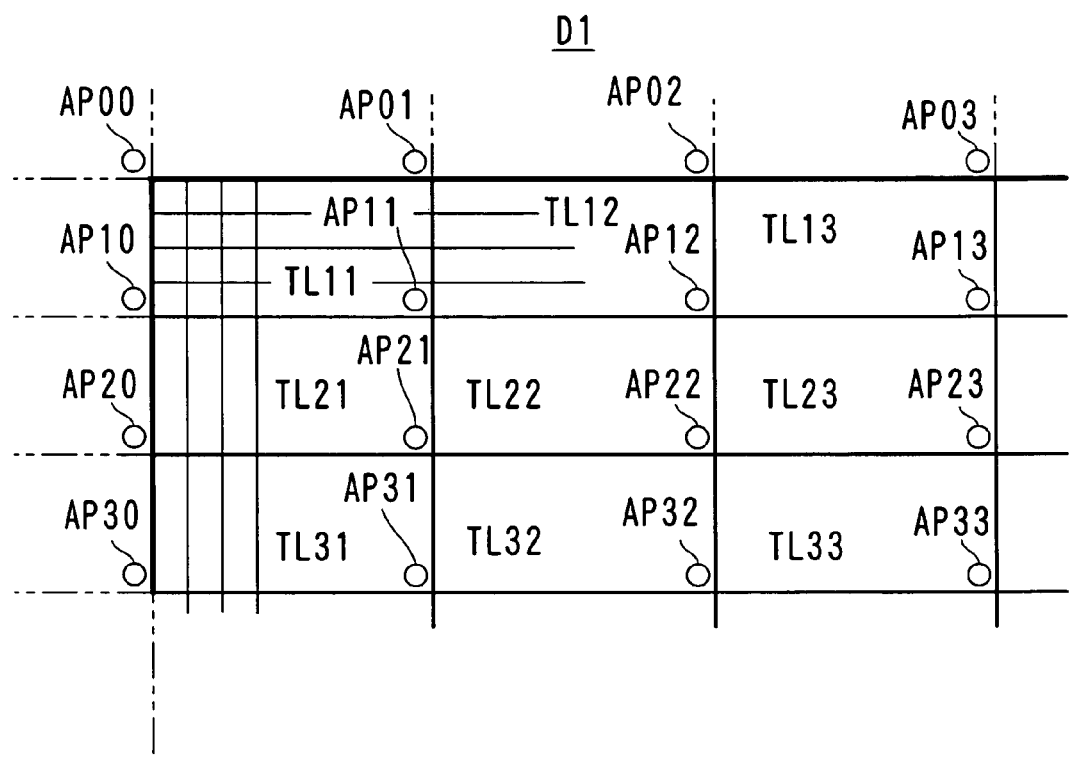
FIG. 9 is a diagram showing an example of a position of a representative value in each area.
Figure 10:
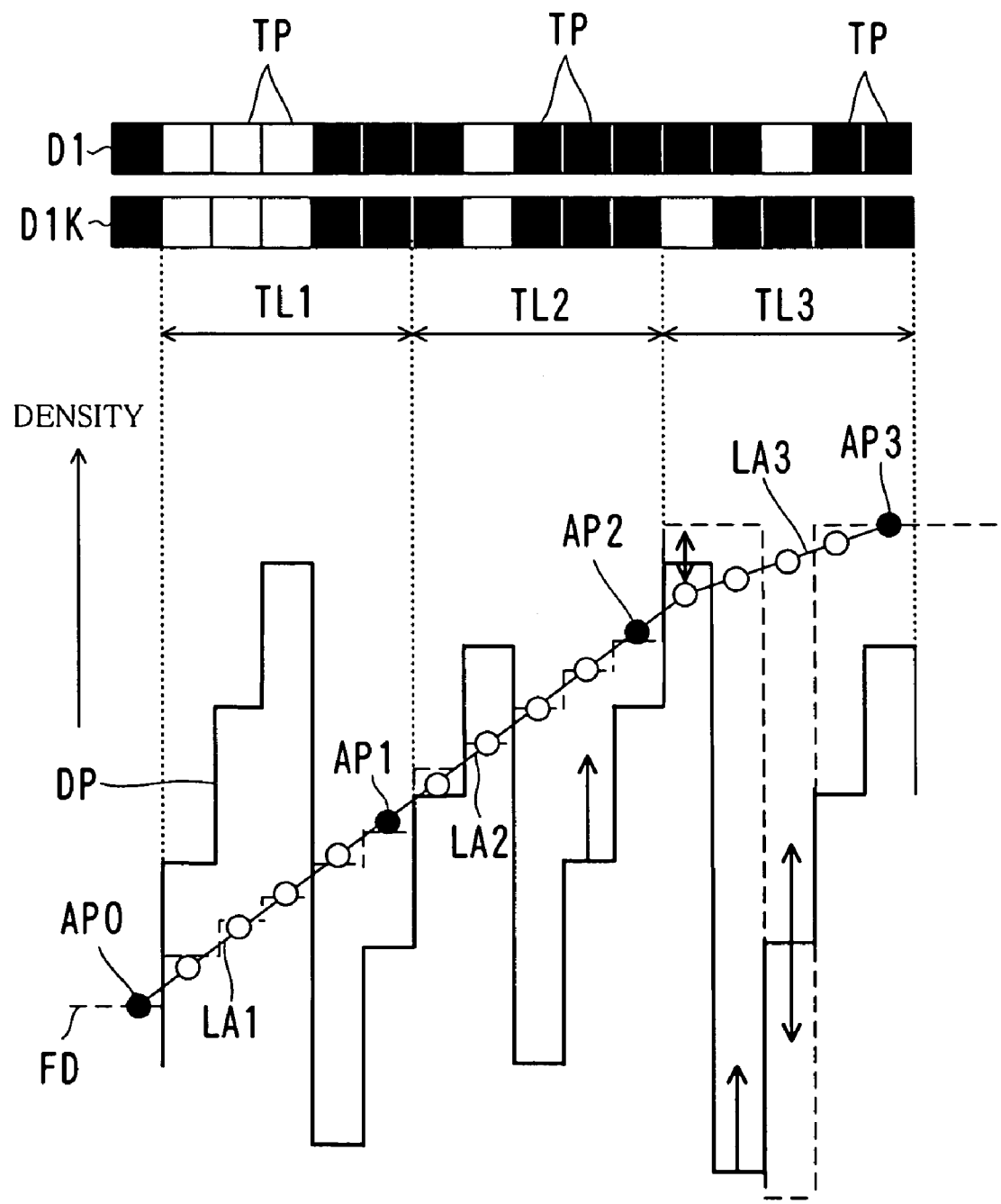
FIG. 10 is a diagram for explaining a method for determining the representative value.

FIG. 3 is a block diagram showing a functional structure of a computer main body 11, FIG. 4 is a block diagram showing a functional structure of a printer 13, FIG. 5 is a general flowchart showing a compression process performed by the computer main body 11, FIG. 6 is a block diagram showing a function of a compressed data generation portion of the computer main body 11, FIG. 7 is a diagram for explaining a defined area TL, FIGS. 8(a) and 8(b) are diagrams showing examples of an area TL and a dither pattern DP, FIG. 9 is a diagram showing an example of a position of a representative value "a" in each area TL, and FIG. 10 is a diagram for explaining a method for determining the representative value.

Although the image data and areas TL are two-dimensional actually, a one-dimensional area TL is illustrated schematically in FIG. 10 for simplifying the explanation.

As shown in FIG. 3, the computer main body 11 is made up of an image database 150, a dither pattern memory portion 160, a compressed data generation portion 100 and the like.

The image database 150 stores a plurality of image data (original image data) FD1, FD2, . . . , FDn having a gradation property. A whole or a part of the image data FD1-FDn may be referred to as "image data FD". Note that most of the image data FD are color images. In this case, one piece of image data FD are made up of cyan (C), magenta (M), yellow (Y) and black (K) color image data. The image data FD are supplied from a scanner, a digital camera or other external devices, or edited or generated internally.

The dither pattern memory portion 160 stores a plurality of types of dither patterns DP11-DP13, DP21-DP23, DP31-DP33 and DP41-DP43. A whole or a part of these may be referred to as a "dither pattern DP".

The dither pattern DP includes dither patterns DP11, DP21, DP31 and DP41 for character areas, dither patterns DP12, DP22, DP32 and DP42 for image areas, dither patterns DP13, DP23, DP33 and DP43 for chart areas and the like for C, M, Y and K colors.

The compressed data generation portion 100 performs the above-mentioned steps 1-4. Hereinafter, functions and processes of the compressed data generation portion 100 will be described with reference to FIGS. 5-10.

[Division of the Area]

As shown in FIGS. 5 and 6, the image data FD are first divided into blocks of predetermined areas TL (#21). The area TL is, as shown in FIG. 7, a rectangular area including 96 (6×16) pixels TP, for example. In the example shown in FIG. 7, the entire area of the image data FD is divided into blocks of the areas TL11, TL12, TL13, . . . on the first line from the upper left to the right, and the areas TL21, TL22, TL23, . . . on the second line, until the last area TLmn.

FIG. 8(a) shows an arrangement pattern (a dot pattern) of dots of a pseudo gradation image, which is obtained by the pseudo gradation process on the image data FD in this area TL by using the dither pattern DP shown in FIG. 8(b).

In FIG. 8(a), black pixels in the area TL are dotted pixels. When a density value of each pixel in the image data FD is more than or equal to the threshold level of the corresponding pixel of the dither pattern DP shown in FIG. 8(b), the pixel is dotted. In other words, the larger the density value is, the higher the density is regarded as. Although FIGS. 8(a) and 8(b) show the example in which the division is performed so that a size of the area TL becomes the same as a size of the dither pattern DP, it is possible that these sizes are different from each other.

[Method for Determining the Representative Value]

Next, the representative value "a" in each area is determined (#22). In this example, a density value (pixel value) of a pixel positioned at an end portion (an apex portion) in each area TL is regarded as the representative value "a".

More specifically, as shown in FIG. 9, a representative value position AP that is a position of the representative value "a" in each area TL is indicated for a part of the image data FD. A representative value position APmn of each area TLmn is positioned at the lower right end in each area TLmn. Also in the outside of the area of the image data FD, the representative value position AP is positioned at the lower right end thereof when it is supposed that the same division is performed as the area TL. Note that a value of the representative value "a" may be denoted by a substitute "APmn" that is a sign indicating a position of the representative value.

In FIG. 10, one-dimensional areas TL1, TL2, TL3, . . . including five pixels TP are indicated for the pseudo gradation images D1 and D1K. Here, it is supposed that the pseudo gradation images D1 and D1K are binary images. Each pixel TP that has two values is indicated by white or black. For example, values of the pixels TP are white, white, white, black and black in the area TL1.

The pseudo gradation image D1 is obtained by performing the binary process on the image data (original image data) FD shown in FIG. 10 by using the dither pattern DP shown in FIG. 10 (#24B). More specifically, if the image data FD is less than or equal to the threshold value of the dither pattern DP, the pixel becomes "white". If the image data FD exceeds the threshold value, the pixel becomes "black".

Initially, a first representative value AP0 is determined. The first representative value AP0 is positioned in the outside of the area of the image data FD, so it can be any value. However, it is set to an appropriate value corresponding to a density value (halftone data) of the left end pixel TP in the area TL1, the threshold value of the dither pattern DP or the like.

Next, the representative value AP1 of the area TL1 is determined. The representative value AP1 is set to a density value of a pixel positioned at an end portion in the area TL1. In the same way for the following areas TL2, TL3, . . . , density values of pixels positioned at end portions are set to the representative values AP2, AP3, . . . in the areas TL.

Then, the representative value AP of the area and the interpolation rule HR are used for each area TL so that a density of each pixel included in the area is determined (#23). Here, as the interpolation rule HR, a linear interpolation is performed. More specifically, two neighboring representative values AP are connected by a straight line LA so as to determine a density value of each pixel. Positions that are indicated by a white circle in FIG. 10 are density values of the pixels. Note that the virtual gradation image made up of the density values of pixels becomes the straight line LA itself when this is indicated in a continuous manner. Therefore, the virtual gradation image may be indicated by "LA".

The pseudo gradation process by using the dither pattern DP is performed on each of virtual gradation images LA made up of the obtained density value of each pixel, so as to obtain the pseudo gradation image D1K shown in FIG. 10 (#24A). Note that this pseudo gradation image D1K is restructured in accordance with the representative value AP, so it may be referred to as a "restructured image".

Then, it is tested whether the pseudo gradation image D1K that is a restructured image has a good reproducibility or not (#24). The reproducibility is determined to be good or not good by comparing the pseudo gradation image D1 with the restructured image D1K (#24C). If an error between them is within a predetermined error range, it is determined that the reproducibility is good. If the error exceeds the predetermined error range, it is determined that the reproducibility is not good (#25).

In FIG. 10, the area TL1 matches the area TL2 completely, so the reproducibility is good without any problem. However, as to the area TL3, the value of the first and third pixels TP are opposite, so the error is two pixels.

In this case, if the error "2" is within the predetermined error range, the error is permissible so that the reproducibility is regarded to be good. If the error "2" exceeds the predetermined error range, the reproducibility is regarded to be no good. The predetermined error range can be set variously as described above. For example, if the error range is set to 15%, the reproducibility is determined to be no good since the error of two pixels out of five pixels corresponds to 40%.

Although an error between the pseudo gradation image D1 and the restructured image D1K is determined for testing the reproducibility in the above description, it is possible to adopt one of other various methods. For example, it is possible to compare a value of each pixel (a density value) obtained from the representative value AP with a pixel value of the original image data FD and check whether the values are positioned on the same side or on opposite sides with respect to the threshold value of the dither pattern DP. More specifically, if the values are positioned on the same side with respect to the threshold value of the dither pattern DP, the images thereof after the pseudo gradation process become the same even if either of them is used. If the values are on opposite sides with respect to the threshold value, it becomes an error. Therefore, it can be determined whether the reproducibility is good or not by checking the number of pixels positioned on the opposite side.

If the reproducibility is good, the encoding process is performed in accordance with the determined representative value AP (#26). In the encoding process, data that are entered, i.e., a difference of the representative value AP, a difference of the number of dots, an attribution code and the like are coded by the Huffman method. The compression process by the Huffman method is very effective for an object having a frequency distribution of signals that does not change largely.

If the reproducibility is no good, the encoding process is performed by using image data on which other process was performed instead of the representative value AP (#27). For example, the image data FD in the area TL are used.

Note that the representative value AP is a value related to a density of the image, so it has a close relationship with neighboring areas, in which the representative values AP are close to each other. More specifically, there is a property that a difference of density is small between neighboring areas, and thus, a difference of the representative value AP is small. Therefore, a difference between the representative value AP in an area TL and the representative value AP in the area TL determined just before that time is zero in many cases, so a bias of a statistical frequency of the difference increases. In other words, it becomes possible to perform the compression with high compressibility in encoding by the Huffman method when a difference of the representative value AP is used instead of the representative value AP itself. Speaking on the contrary, it is desirable to select the representative value "a" within a possible range so that the difference becomes as close to zero as possible.

In the area TL where it is determined that a change of the representative value AP is large, a switching signal is delivered adding to the differential of the representative value AP, so that the printer 13 can recognize. After that, the image data FD in the area TL are delivered. It is possible to deliver the image data FD as they are. However, in order to earn compressibility in encoding, a difference between a pixel value obtained by interpolation and a pixel value of the original image is encoded. If the original image is a picture image, a difference between neighboring areas is small in many cases. Therefore, compression can be performed by encoding. If the original image is a mixed image of characters and pictures, a pseudo gradation image in the area or original image data should be encoded to obtain a good result.

The processes described above are repeated for every area TL of the image data FD (#28).

[Restoration Process]

Next, the reconstruction process performed by the printer 13 will be explained.

As shown in FIG. 4, the printer 13 is made up of a dither pattern memory portion 360, a data reconstruction portion 300, a decode table memory portion 370, a line buffer 380 and the like.

The dither pattern memory portion 360 stores a dither pattern DP that is the same as the dither pattern DP that stored in the dither pattern memory portion 160 of the computer main body 11. Although this dither pattern DP was transmitted from the computer main body 11 in advance, it is possible to store the same dither pattern DP in an appropriate memory, which is embedded in the printer 13.

The decode table memory portion 370 stores the decode table DC that is sent from the computer 11.

The data reconstruction portion 300 refers to a predetermined dither pattern DP, the decode table DC and the interpolation rule HR so as to perform reconstruction of the compressed data D2 received from the computer 11 and to reproduce a dot pattern. Furthermore, the data reconstruction portion 300 is provided with the interpolation rule HR that is the same as the interpolation rule HR that is used in the compressed data generation portion 100, as a process circuit or a program that executes the same.

The line buffer 380 stores temporarily the binary image data sent from the data reconstruction portion 300. The binary image data stored in the line buffer 380 are outputted every six lines, for example, and are printed on a paper sheet.

[Other Example of the Compression Process and the Reconstruction Process]

Next, other example of the compression process and the reconstruction process will be described with reference to flowcharts shown in FIGS. 11 and 12.

Figure 11:
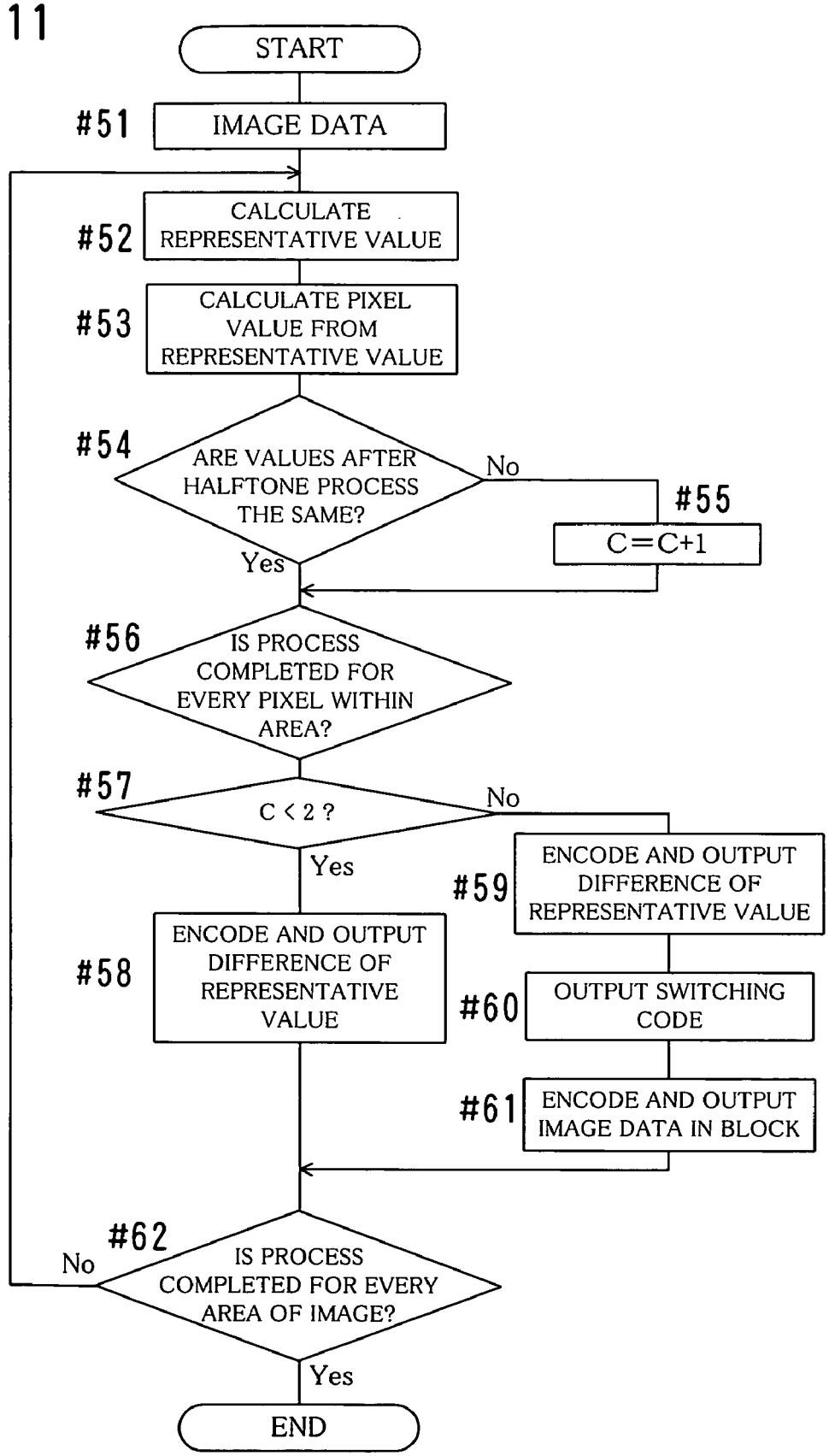
FIG. 11 is a flowchart showing another example of the compression process in outline.
Figure 12:
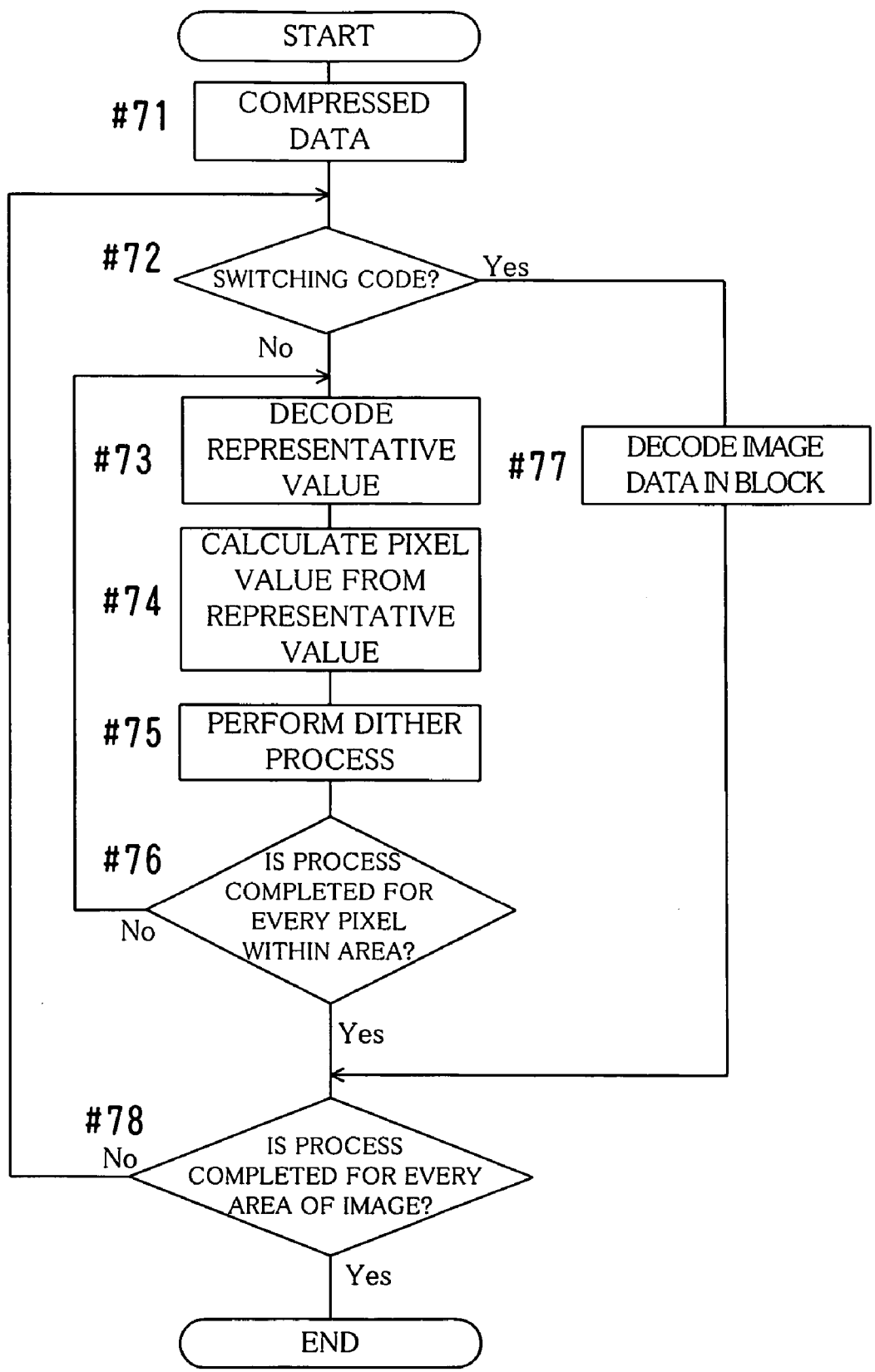
FIG. 12 is a flowchart showing an example of a reconstruction process in outline.

FIG. 11 is a flowchart showing another example of the compression process in outline, and FIG. 12 is a flowchart showing an example of a reconstruction process in outline.

In FIG. 11, concerning the image data FD that is divided into each area TL (#51), a representative value AP of each area is determined (#52). A density of each pixel is determined from the representative value AP (#53). It is decided whether or not a value obtained by the pseudo gradation process on the virtual gradation image and a value obtained by the pseudo gradation process on the image data FD match each other (#54). If they do not match each other, a counter is incremented (#55). These steps are repeated for every pixel within the area (#56).

If a value of the counter is less than or equal to a predetermined value ("2" in this example) (Yes in #57), a difference of the representative value AP is encoded and outputted (#58). If the value of the counter is above the predetermined value, the difference of the representative value AP is encoded and outputted (#59). Then, a switching code is outputted (#60), and the image data FD in the area are encoded and outputted (#61). These steps are repeated for every area of the image data FD (#62).

In FIG. 12, when the compressed data are received (#71), it is checked whether or not the switching code exists (#72). If the switching code exists, the image data FD in the area are decoded and outputted (#77). If the switching code does not exist, the representative value AP is decoded (#73), and a density value of each pixel is calculated from the representative value AP (#74). The density value is compared with the threshold value of the dither pattern DP for a binary process (#75). These steps are repeated for every pixel in the area, and a pseudo gradation image is generated and outputted (#76). These steps are repeated for every area of the image data FD (#78).

[Case where the Pseudo Gradation Image is a Multivalued Image]

The example described above is the case where the pseudo gradation image is a binary image. This compression method (the representative value compression method) can also be applied to the case where the pseudo gradation image is a multivalued image.

Next, the case where the pseudo gradation image is four-valued image data will be described. This case is basically the same as the case where the binary image data are compressed. Therefore, the above description and drawings can be used here substantially in the same way. Only main differences will be described here. In order to simplify explanation, it is supposed that the area TL is a one-dimensional area.

Figure 13:
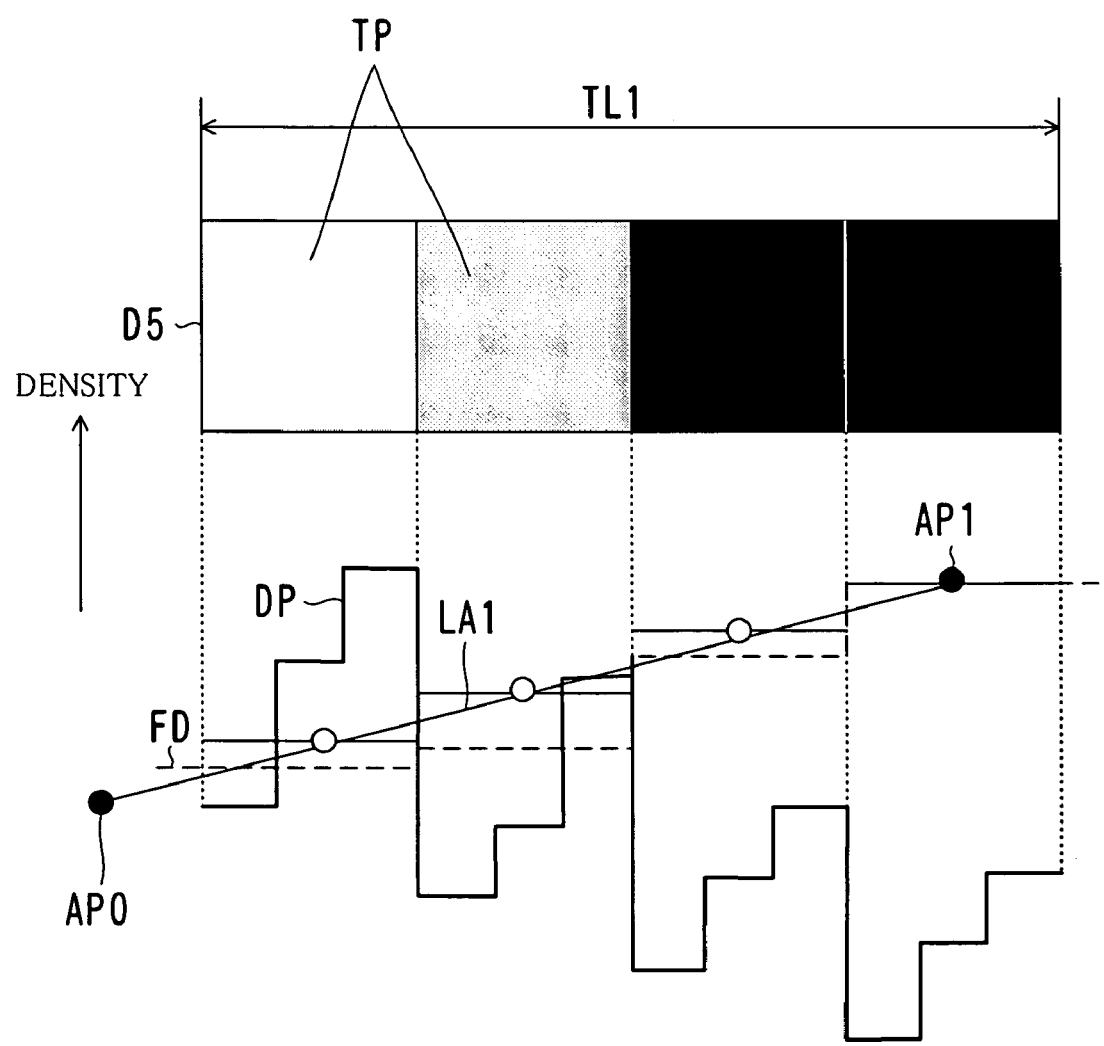
FIG. 13 is a diagram for explaining a method for determining a representative value of four-valued image data.
Figure 14:
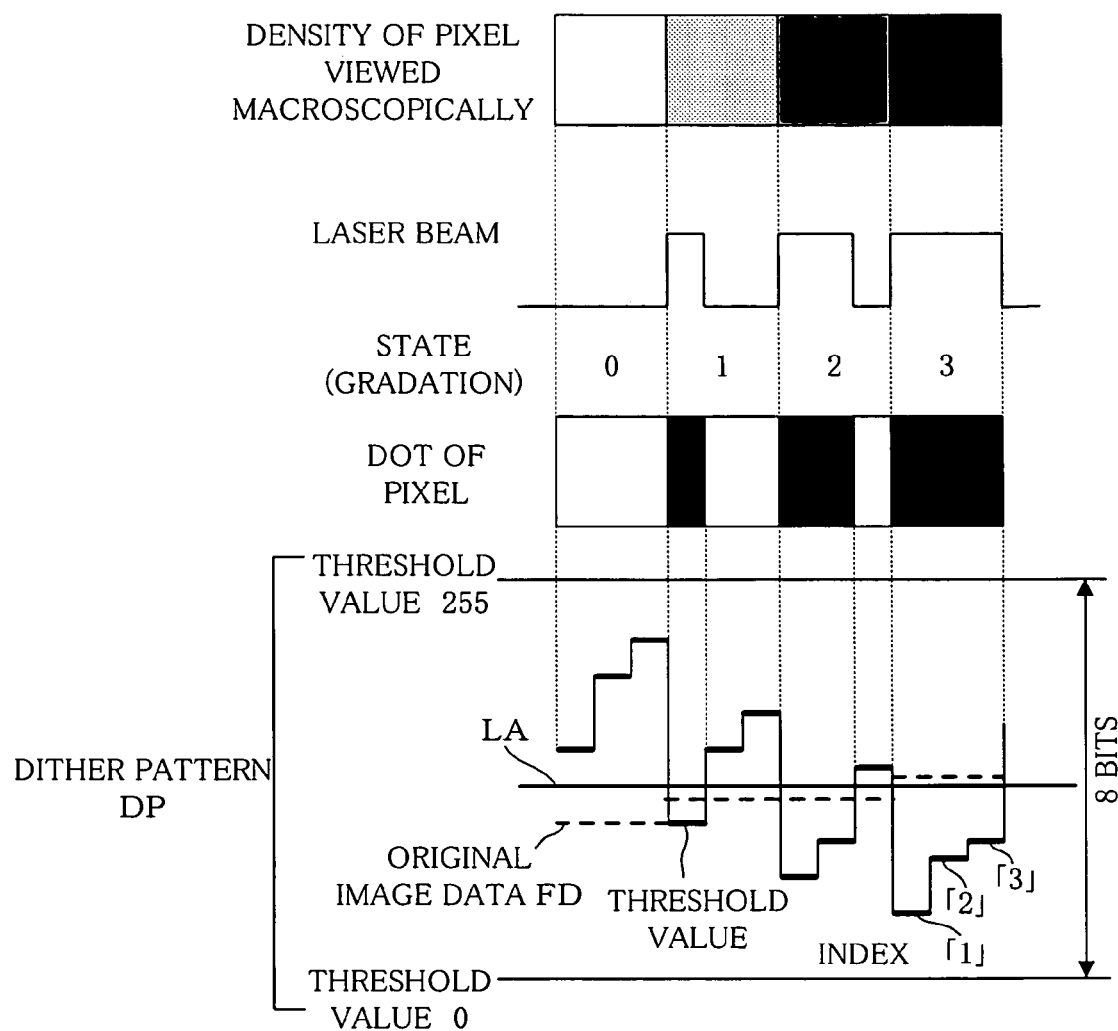
FIG. 14 is a diagram for explaining four-valued image data.

FIG. 13 is a diagram for explaining a method for determining a representative value of four-valued image data, and FIG. 14 is a diagram for explaining four-valued image data D5.

The difference is that each pixel has three threshold values in the four-valued image, and that each pixel of the pseudo gradation image D5 can have four values (gradation values). It is determined whether a pixel value obtained by performing the interpolation process on the representative value AP and a pixel value of the original image data FD are positioned on the same side separated by the threshold value in each pixel position. If they are not positioned on the same side, the number of pixels is counted and determined.

As shown in FIG. 14, in the case of the four-valued image, corresponding to each state of "0", "1", "2" or "3", light emission time of a laser of the printer is controlled (pulse width control) for example, so that a density of a pixel can be changed in four steps. Thus, these states "0", "1", "2" and "3" correspond to gradation values.

More specifically, the laser does not emit light in the state "0", so the pixel becomes "white". In the state "1", the laser emits light for approximately one third of the time period corresponding to a pixel width, so that approximately one third of the area of the pixel becomes "black". Similarly, in the state "2" or "3", the laser emits light for approximately two thirds or three thirds of the time period corresponding to the pixel width, so that approximately two thirds or the entire of the area of the pixel becomes "black". In other words, four gradation density values are obtained corresponding to the values of the state. Four states indicating four gradation values can be represented by two bits. Therefore, eight bits can represent four pixels having four gradation values.

Note that the relationship among the light emission time of the laser, a size of a dot formed by the laser and a density thereof in a macroscopic view is complicated. The above description is merely an example for explanation.

The threshold value of the dither pattern DP is a value within the range of 0-255, and three threshold values are set for each pixel. In each pixel, indexes (numerals) of "1", "2" and "3" are assigned to the three threshold values in the ascending order. The image data FD having a density value smaller than the lowest threshold value with the index "1" is in the state "0". The image data FD having a density value between the threshold value of the index "1" and the threshold value of the index "2" is in the state "1". The image data FD having a density value between the threshold value of the index "2" and the threshold value of the index "3" is in the state "2". The image data FD having a density value larger than the highest threshold value of the index "3" is in the state "3". In general, different pixels have different threshold values with respect to the same index. In FIG. 14, a virtual gradation image LA is shown corresponding to the image data FD.

In FIG. 13, initially, a first representative value AP0 is determined. Next, a representative value AP1 of the area TL1 is determined. A density value of a fourth pixel positioned at the end portion of the area TL1 is regarded to be the representative value AP1. Using the interpolation rule HR that is the linear interpolation, a density value of each pixel is determined from the two neighboring representative values AP0 and AP1 by the interpolation. Positions that are indicated by a white circle in FIG. 13 are density values of the pixels.

In the example shown in FIG. 13, the density values of the pixels are positioned on the same side as the image data FD with respect to the threshold value of the dither pattern DP for every pixel in the area TL1. Therefore, the error is zero. Accordingly, the reproducibility is good so that the image data FD in the area TL1 can be replaced with the representative value AP.

[Interpolation Rule that the Pixel Value in the Area is Equal to the Representative Value]

In the example described above, the pixel value in each area is determined by interpolation using a plurality of representative values AP. Next, an example will be described, which uses an interpolation rule HR1 that the density value of each pixel in the area is equal to the representative value AP in the area.

Figure 15:
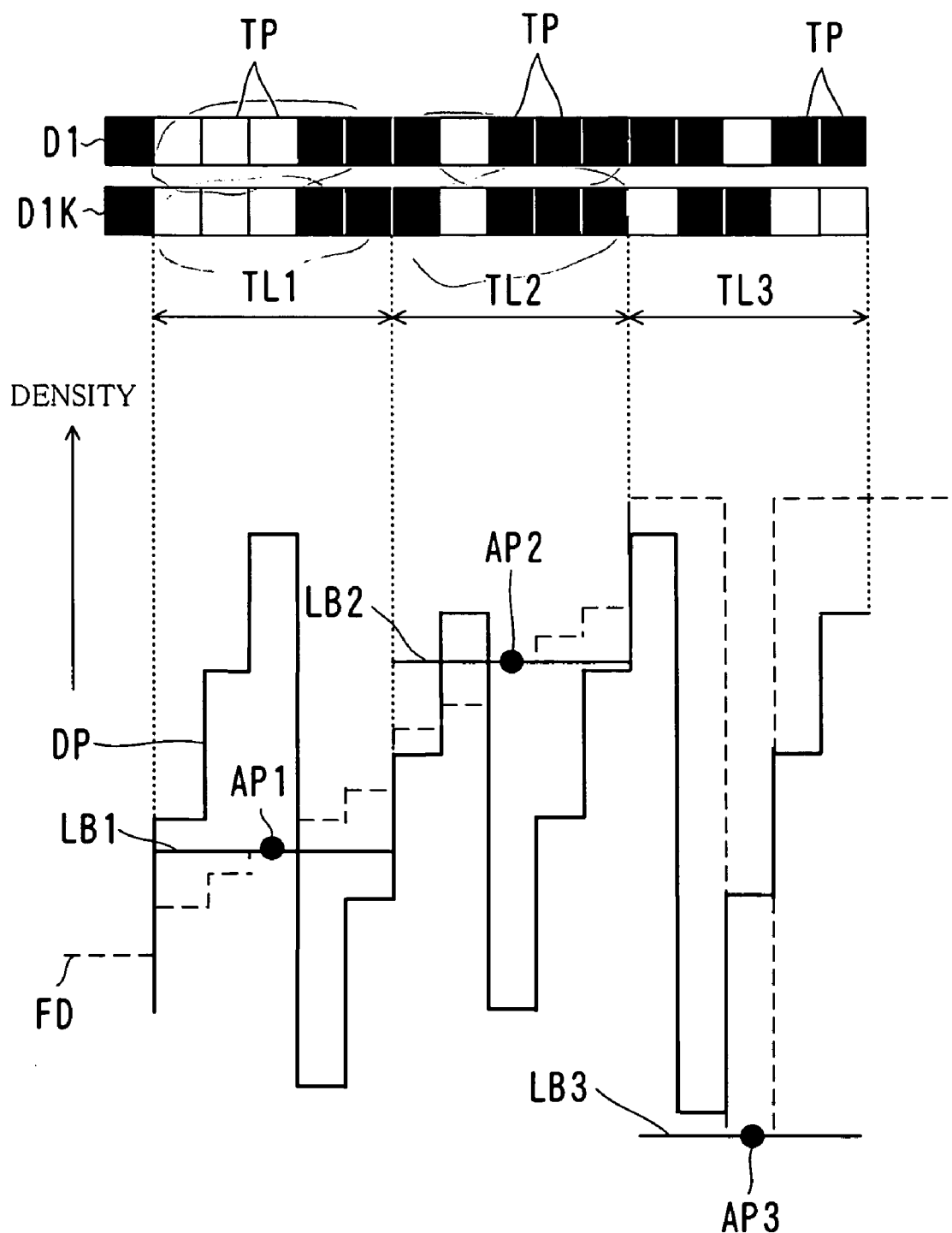
FIG. 15 is a diagram for explaining an interpolation rule that a pixel value is equal to the representative value.
Figure 16:
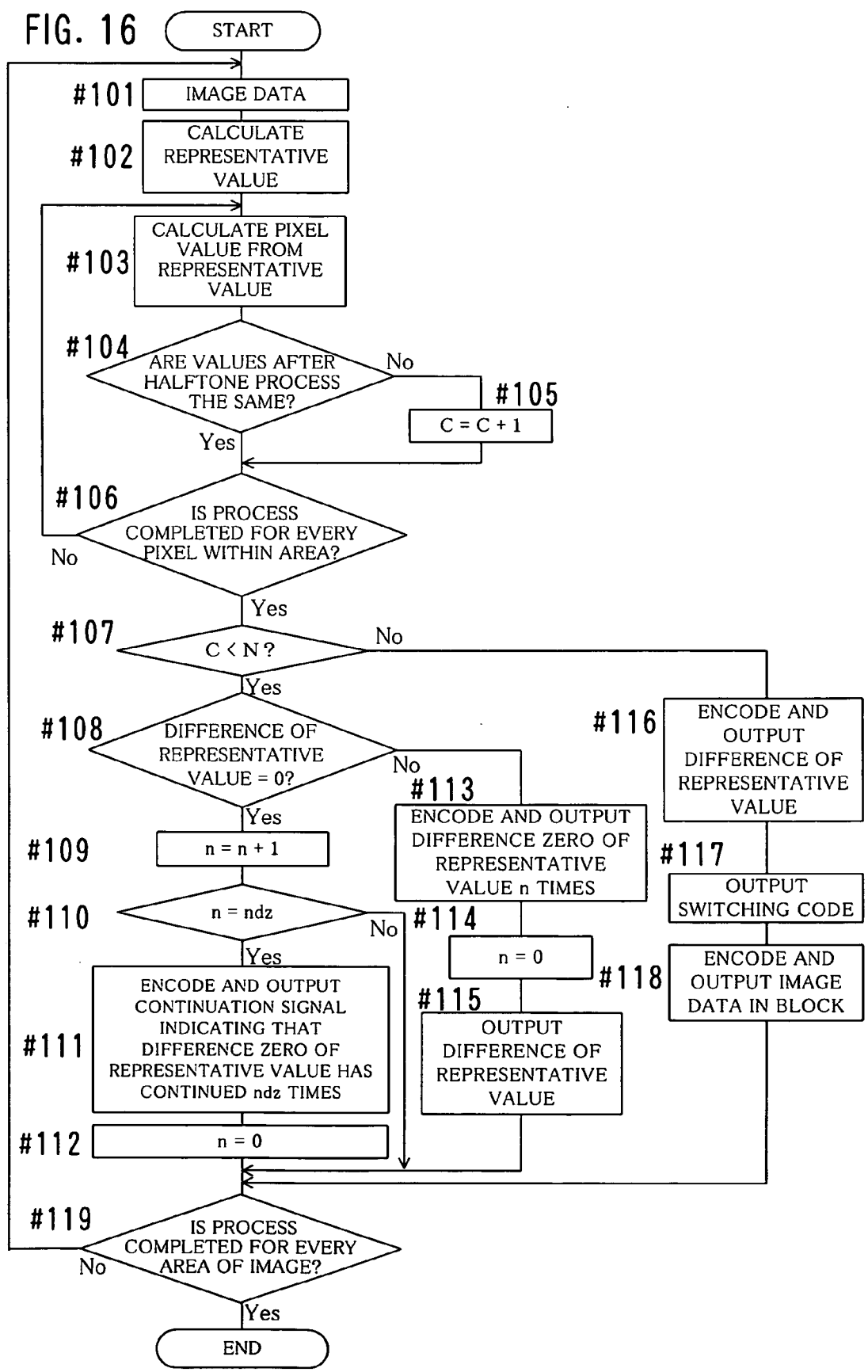
FIG. 16 is a flowchart showing another example of the compression process in outline.
Figure 17:
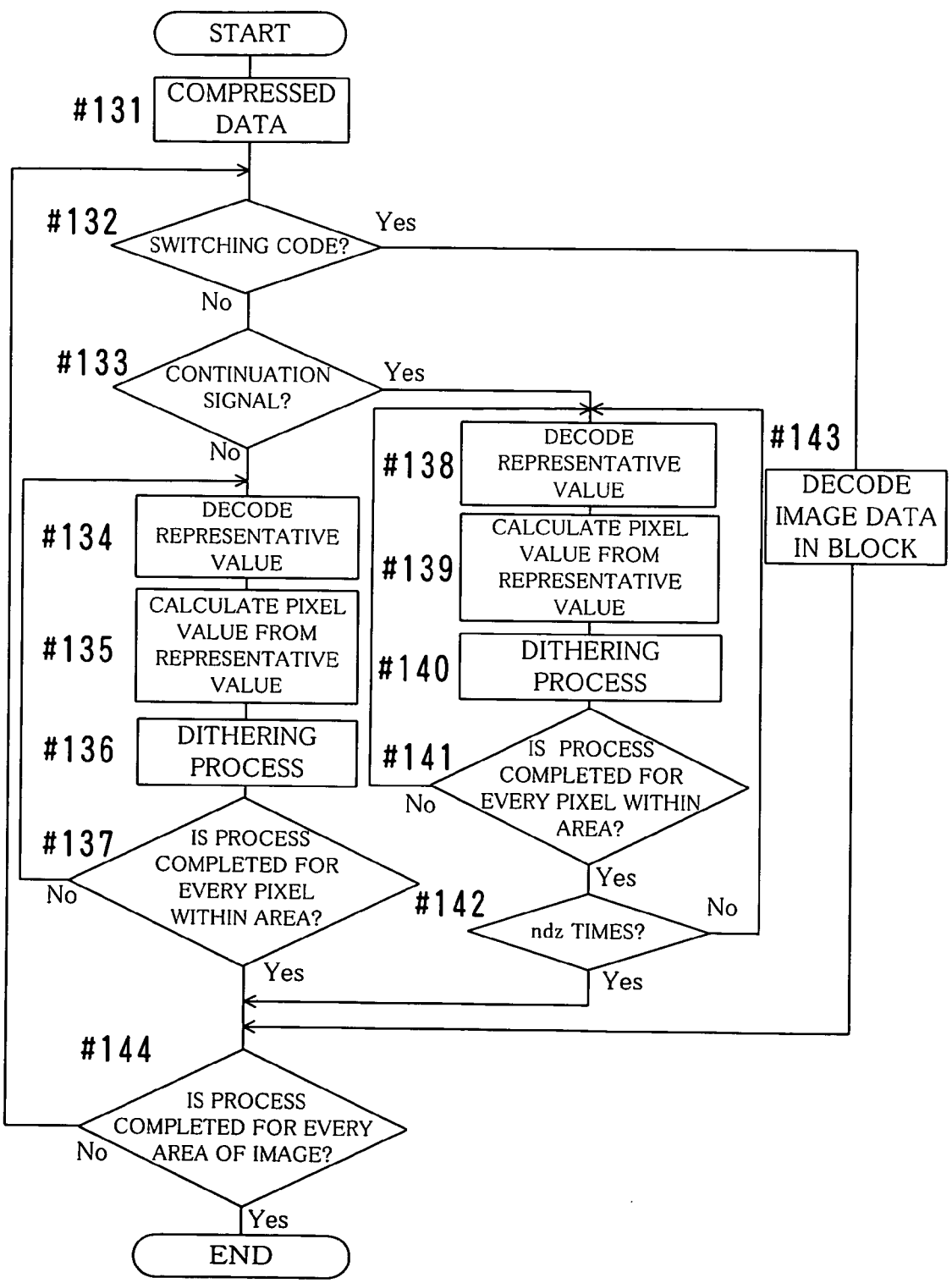
FIG. 17 is a flowchart showing another example of the reconstruction process in outline.

FIG. 15 is a diagram for explaining the interpolation rule HR1 that a pixel value in the area is equal to the representative value, FIG. 16 is a flowchart showing another example of the compression process in outline, and FIG. 17 is a flowchart showing another example of the reconstruction process in outline.

In FIG. 15, one-dimensional areas TL1, TL2, TL3, . . . made up of five pixels TP each are shown for the pseudo gradation images D1 and D1K. Here, it is supposed that the pseudo gradation images D1 and D1K are binary images.

Initially, a density value of a pixel TP included in the first area TL1 is equal to the representative value AP1. Therefore, a virtual gradation image LB1 in the area TL1 is a horizontal straight line. In the same way, virtual gradation images LB2 and LB3 in the second and third areas TL2 and TL3 are horizontal straight lines. When the pseudo gradation process is performed on these virtual gradation images LB1, LB2 and LB3 by using the dither pattern DP, the pseudo gradation image D1K is obtained.

In FIG. 15, as to the area TL1 and the area TL2, the pseudo gradation image D1 matches the pseudo gradation image D1K completely, so the reproducibility thereof is good without any problem. However, as to the area TL3, the pseudo gradation image D1 differs from the pseudo gradation image D1K in value of the first and third pixels and the error is two pixels.

In this way, if the interpolation rule HR1 is applied, a substantial interpolation calculation is not performed, so a quantity of calculation is least compared with other case of the interpolation rule HR. In addition, for the area TL, like the area TL3, where the image quality decreases when the representative value AP is used, it is not necessary to output the representative value AP. In other words, the step #116 in the flowchart shown in FIG. 16 below can be omitted.

In FIG. 16, concerning the image data FD that is divided into each area TL (#101), a representative value AP of each area is determined (#102). A density of each pixel is determined from the representative value AP (#103). It is decided whether or not a value obtained by the pseudo gradation process on the virtual gradation image and a value obtained by the pseudo gradation process on the image data FD match each other (#104). If they do not match each other, a counter is incremented (#105). These steps are repeated for every pixel within the area (#106).

If a value of the counter is less than or equal to a predetermined value N (Yes in #107), and if a difference of the representative value is zero (Yes in #108), one is added to a variable n indicating the number of continuation times is added (#109). When a value of the variable n becomes "ndz" (Yes in #110), a continuation signal indicating that the difference zero of the representative value has continued ndz times is encoded and outputted (#111), and the variable n is initialized to zero (#112).

If the decision result in the step #108 is "No", i.e., if the difference of the representative value is not zero, the difference "0" of the representative value is encoded and outputted n times corresponding to the number of times in the past (#113). Then, the variable n is initialized to zero (#114), and the difference of the representative value is outputted (#115).

If the decision result in the step #107 is "No", i.e., if a value of the counter exceeds the predetermined value N, the difference of the representative value is encoded and outputted (#116), the switching code is outputted (#117), and the image data FD in the area are encoded and outputted (#118). These steps are repeated for every area of the image data FD (#119).

In FIG. 17, when the compressed data are received (#131), it is checked whether or not the switching code exists (#132). If the switching code exists, the image data FD in the area are decoded and outputted (#143). If the switching code does not exist, it is checked whether or not the continuation signal exists (#133). If the continuation signal exists, the representative value AP is decoded from the difference of the representative value (#138). Then, a density value of each pixel is calculated from the representative value AP (#139), and it is compared with the threshold value of the dither pattern DP to be binary data (#140). These steps are repeated for every pixel in the area (#141) ndz times (#142).

If the continuation signal does not exist (No in #133), the representative value AP is decoded from the difference of the representative value (#134), and the density value of each pixel is calculated from the representative value AP (#135). Then, it is compared with the threshold value of the dither pattern DP to be binary data (#136). These steps are repeated for every pixel in the area (#137). These steps are repeated for every area in the image data FD (#144).

In the flowcharts described above and shown in FIGS. 16 and 17, the number of times when a difference of the representative value AP becomes zero is counted and encoded. In this way, the state where a difference of the representative value AP is zero appears continuously in may cases, so the compressibility can be increased further.

[Other Example of the Method for Determining the Representative Value]

Figure 18:
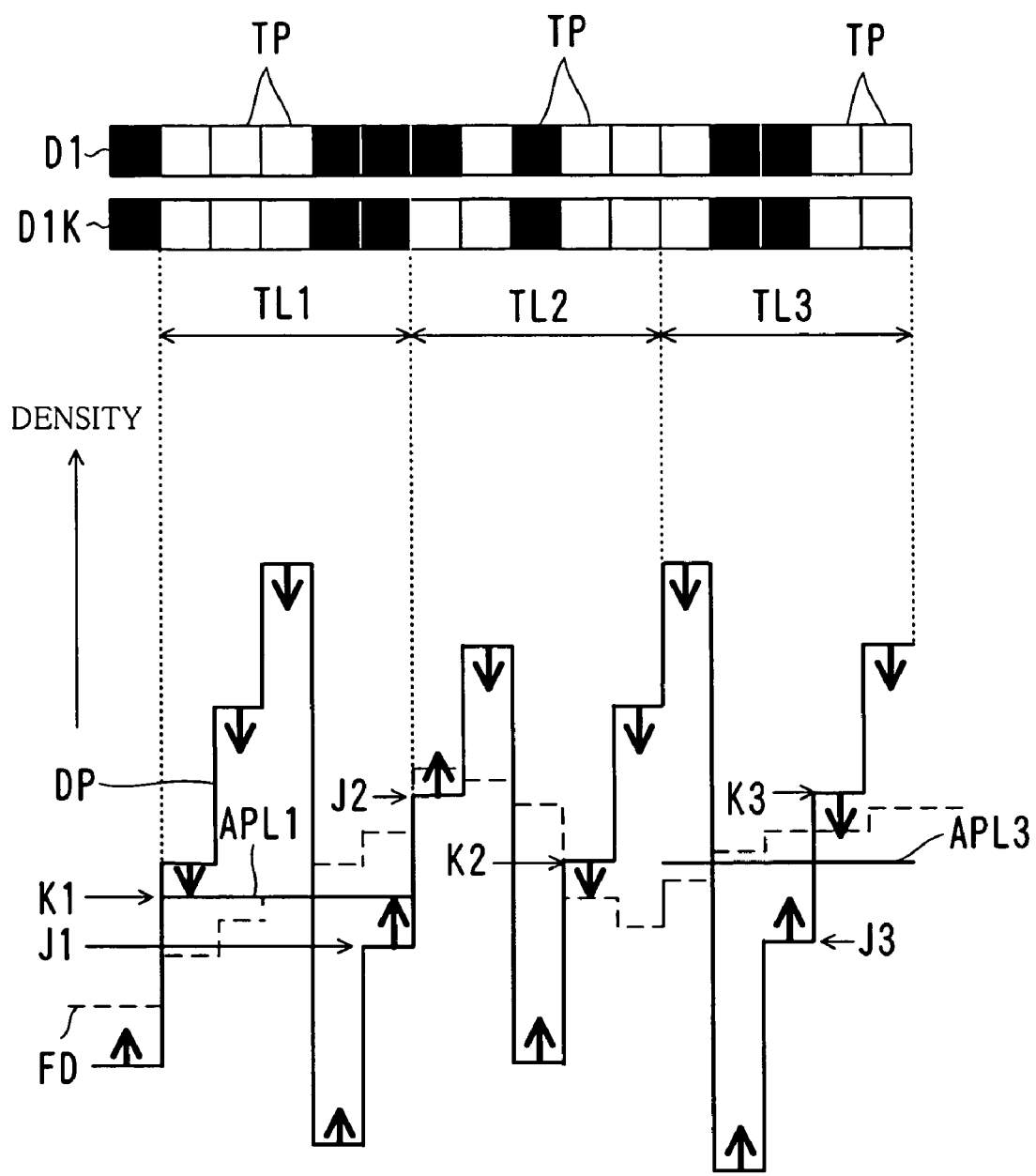
FIG. 18 is a diagram for explaining another example of a method for determining the representative value.

FIG. 18 is a diagram for explaining another example of a method for determining the representative value.

In FIG. 18, initially, a representative value AP1 of a first area TL1 is determined. A minimum value K1 of the threshold value in the case where a threshold value of the dither pattern is larger than a density value of the image data FD and a maximum value J1 of the threshold value in the case where a threshold value of the dither pattern DP is smaller than a density value of the image data FD are determined. Then, the representative value AP1 is selected from between the minimum value-K and the maximum value J. More specifically, a representative value AP that satisfies the expression (1) below is determined.

$$J \leq AP \leq K \quad (1)$$

In this way, a possible range of the representative value AP (a representative value range) is between the maximum value J and the minimum value K. In FIG. 18, an example of the representative value AP1 within the representative value range is shown by a horizontal straight line APL1.

As to a second area TL2, a representative value AP that satisfies the above expression (1) does not exist because the minimum value K is smaller than the maximum value J. In this case, therefore, an appropriate value is temporarily is set for the representative value AP2. If the pseudo gradation image D1K that is obtained by the temporarily set representative value AP2 is within a predetermined error range with respect to the pseudo gradation image D1 of the original image data FD, this representative value AP2 is used. However, a small drop of the image quality can be generated. If it is not within the error range, other data, e.g., image data FD may be used.

As to a third area TL3, there is a representative value AP3 that satisfies the above expression (1). Therefore, such an appropriate representative value AP3 is determined.

When the representative value AP is determined in this method, the interpolation rule HR1 should be used for decoding, too. This method is convenient since it is also determined whether or not image quality is dropped V when determining the representative value AP.

Although a binary process and a four-value process are performed as the pseudo gradation process in this embodiment, it is possible to adopt a three-value process, an eight-value process, a sixteen-value process or other various multivalued process. A position of the representative value in each area can be other than the position described above, e.g., a middle position of the area, other apex in the area or the like.

[Second Example]

Figure 19:
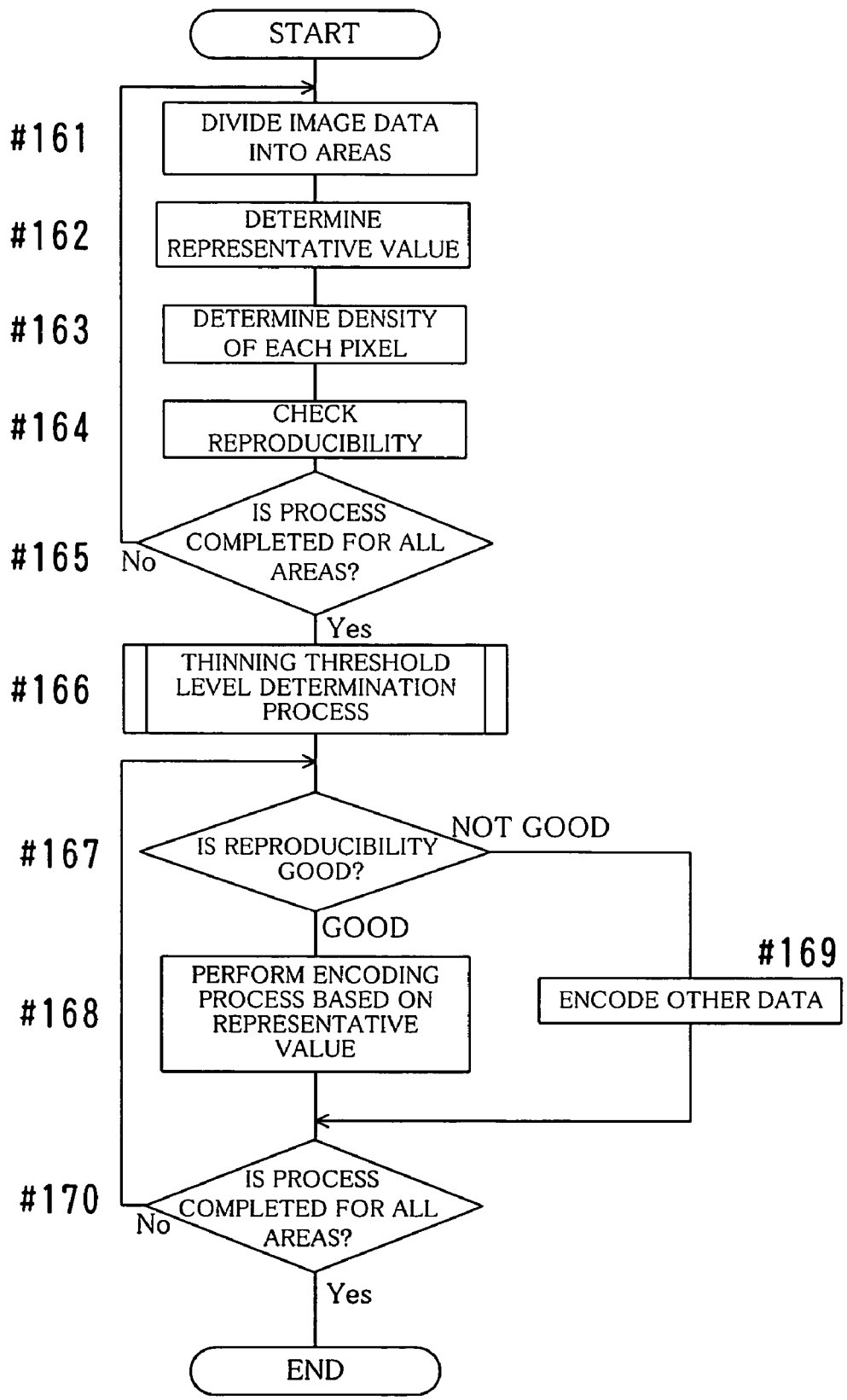
FIG. 19 is a flowchart for explaining a compression process according to a second example.
Figure 20:
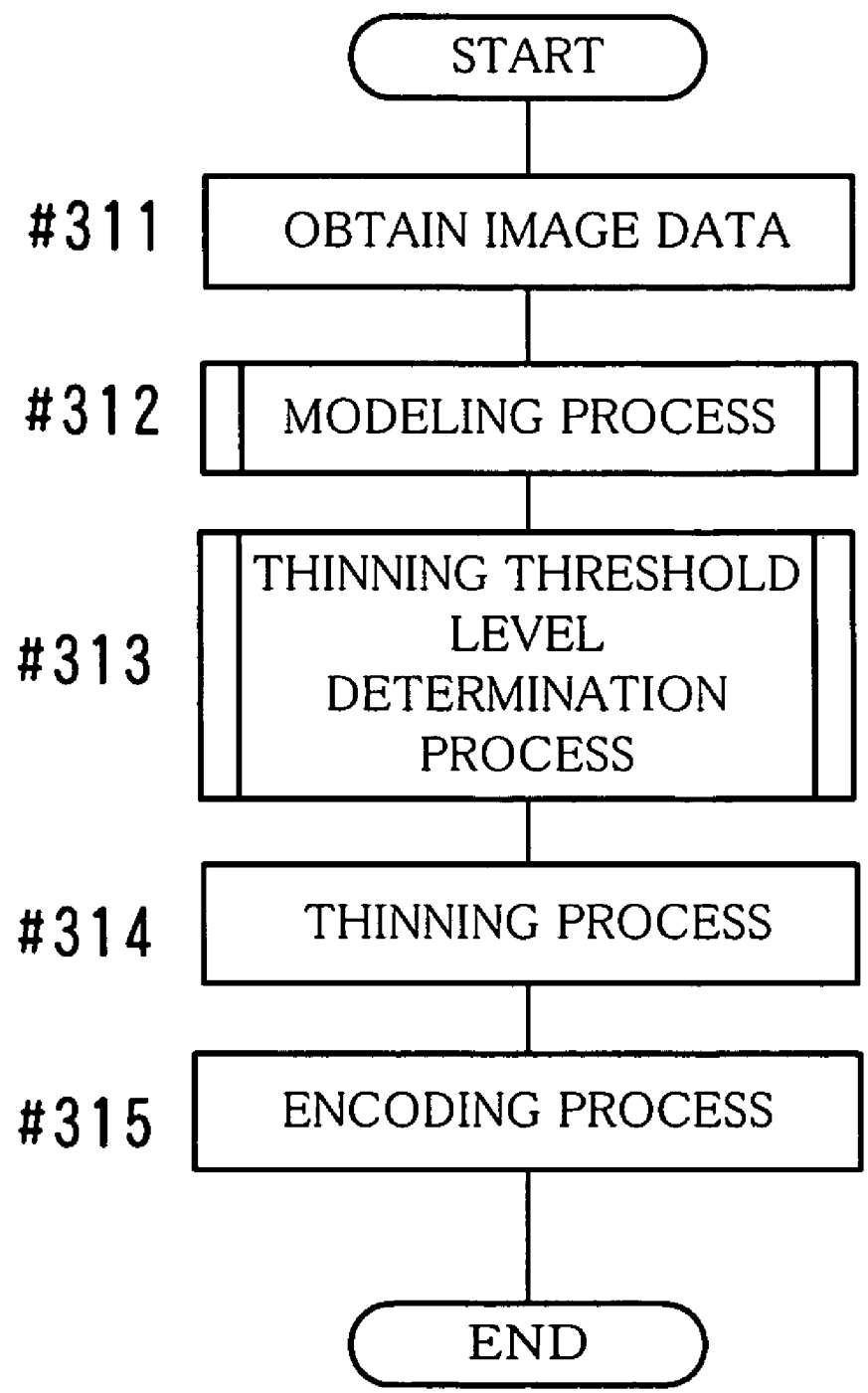
FIG. 20 is a flowchart showing the compression process according to the second example in outline.

FIG. 19 is a flowchart for explaining a compression process according to a second example, and FIG. 20 is a flowchart showing the compression process according to the second example in outline.

Next, the second example will be described.

In this example, as shown in FIG. 19, the process corresponding to the steps #21 through #24 shown in FIG. 5 is performed for every defined area TL (#161 through #165). Then, the error range (a thinning threshold level MH) that is used for decision whether the reproducibility is good is determined (#166). Further, the process corresponding to the steps #25 through #28 shown in FIG. 5 is performed for every area TL (#167 through #170).

In this example, the image data FD are compressed so that a quantity of data (a size) of the compressed data D2 is within a predetermined target quantity of data GL and is a quantity of data close to the target quantity of data GL. In order to realize this compression, characteristics of the image data FD are extracted in the process of the steps #161 through #164 shown in FIG. 19. In general, extraction of characteristics of data to be compressed is called "modeling". Therefore, the process of the step #161 through the step #164 is called a "modeling process" here in particular.

Furthermore, in the process of the steps #167 through #170, the reproducibility is decided. If the reproducibility is decided to be good, the compressed data D2 are generated by using the representative value. Thus, a quantity of data is reduced. More specifically, information included in the image is thinned out by using the representative value. Therefore, the process of the steps #167 through #170 is called a "thinning process" here in particular. Furthermore, the error range that is used for deciding the reproducibility in this thinning process is called a "thinning threshold level MH". Thus, the process of this example can be shown in a simplified form as shown in FIG. 20.

Figure 21:
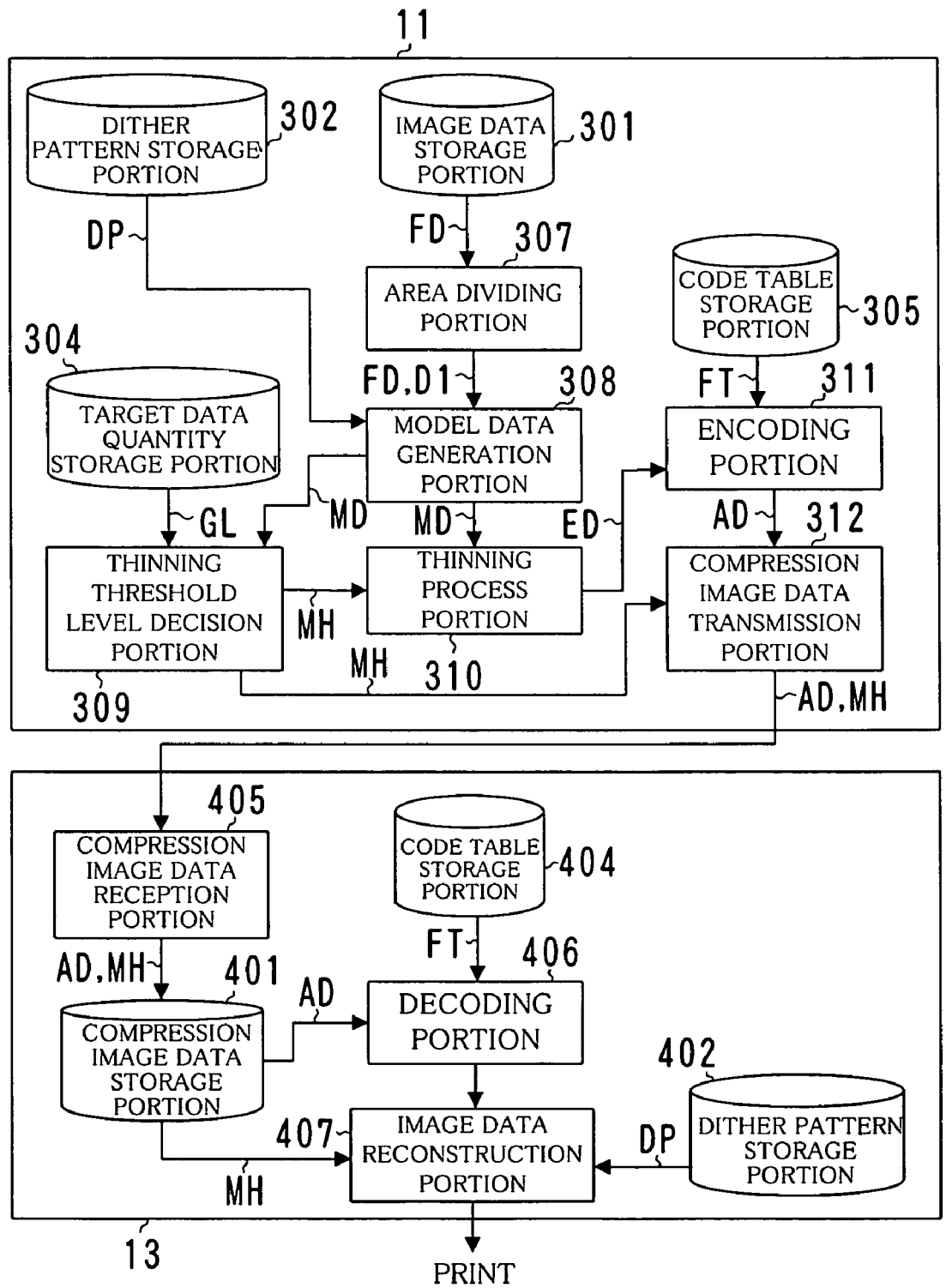
FIG. 21 is a diagram showing an example of a functional structure of a print system in the second example.

FIG. 21 is a diagram showing an example of a functional structure of a print system 1 in the second example. Next, the functional structure of the print system 1 in the second example will be described with reference to FIG. 21.

The computer main body 11 is equipped with functions as shown in FIG. 21, which include an image data storage portion 301, a dither pattern storage portion 302, a target data quantity storage portion 304, a code table storage portion 305, an area dividing portion 307, a model data generation portion 308, a thinning threshold level decision portion 309, a thinning process portion 310, an encoding portion 311 and a compression image data transmission portion 312.

The printer 13 is equipped with functions that include a compression image data storage portion 401, a dither pattern storage portion 402, a code table storage portion 404, a compression image data reception portion 405, a decoding portion 406 and an image data reconstruction portion 407.

In FIG. 21, the image data storage portion 301 stores the image data FD having a gradation property.

The dither pattern storage portions 302 and 402 store the dither pattern DP that is used for a pseudo gradation process performed on the image data FD.

The target data quantity storage portion 304 stores the target quantity of data GL. As the target quantity of data GL, a value that is smaller than a memory capacity of the printer 13 is preset.

The code table storage portions 305 and 404 store the code table FT1 as shown in FIG. 25. These code tables FT will be described in detail later.

The compression image data storage portion 401 stores the compressed data D2 that are sent from the computer main body 11.

When a print instruction is issued by a user, the area dividing portion 307 of the computer main body 11 obtains the image data FD that are an object of the compression process from the image data storage portion 301 and divides the same into a plurality of small areas (blocks). In this example, the defined area is referred to as a "partition area TL". In addition, a process that is performed for each partition area TL may be explained noting one partition area TL. In this case, the noted partition area TL is referred to as a "noted area TL".

The model data generation portion 308 generates "model data MD" from the image data FD by performing the modeling process. In other words, it converts the image data FD into the model data MD. This modeling process is performed for each partition area TL, so that the model data MD1, MD2, MD3, . . . are generated for the areas TL1, TL2, TL3, . . . , respectively. Hereinafter these may be referred to as "model data MD" collectively. It is the same for other data or the like.

The thinning threshold level decision portion 309 determines the thinning threshold level MH in accordance with the model data MD and the target quantity of data GL stored in the target data quantity storage portion 304. This determination is performed, for example, as follows.

First, a quantity of data in the compressed data D2 is calculated as a trial in the case of using the thinning threshold level MH with least thinned data by the thinning process (the best image quality). If the quantity of data obtained by the trial calculation is smaller than the target quantity of data GL, the thinning threshold level MH is determined to be the thinning threshold level MH that is used for the real thinning process.

If the quantity of data obtained by the trial calculation is equal to the target quantity of data GL or more, a quantity of data in the compressed data D2 is calculated as a trial in the case where the value of the thinning threshold level MH is further increased. Then, a thinning threshold level MH such that the quantity of data obtained by the trial calculation is smaller than the target quantity of data is determined, and the thinning threshold level MH is determined to be the thinning threshold level MH that is used for the real thinning process.

The thinning process portion 310 performs the thinning process by using the thinning threshold level MH determined by the thinning threshold level decision portion 309 and the model data MD so as to generate thinned data ED. In other words, it converts the model data MD into the thinned data ED.

The encoding portion 311 generates the compressed data D2 by encoding the thinned data ED. In other words, it converts the thinned data ED into the compressed data D2.

The compression image data transmission portion 110 transmits the compressed data D2 to the printer 13 together with the thinning threshold level MH that was used in the thinning process performed by the thinning process portion 310.

The compression image data reception portion 204 of the printer 13 receives the compressed data D2 and the thinning threshold level MH that are sent from the computer main body 11, and it stores them in the compression image data storage portion 401.

The decoding portion 406 obtains the compressed data D2 stored in the compression image data storage portion 401. The obtained compressed data D2 are decoded by using the code table FT1 stored in the code table storage portion 404.

The image data reconstruction portion 407 generates the pseudo gradation image data D1 from data decoded by the decoding portion 406. On this occasion, the thinning threshold level MH stored in the compression image data storage portion 401 and the dither pattern stored in the dither pattern storage portion 402 are used as necessity.

Hereinafter, processes in this example will be described while breaking them down into the "modeling process", the "thinning process", the "encoding process", a "thinning threshold level determination process" and other items.

[Modeling Process]

Figure 22:
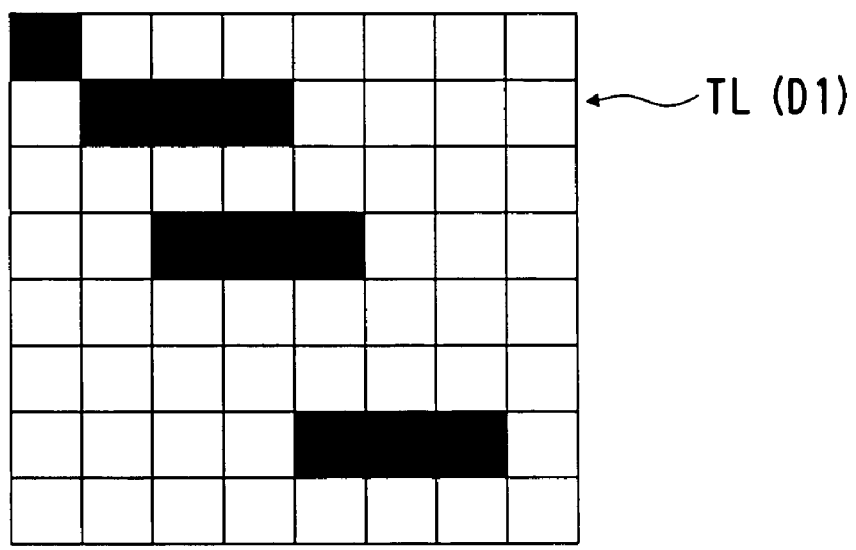
FIGS. 22(a) and 22(b) are diagrams showing examples of an area TL and a dither pattern.
Figure 23:
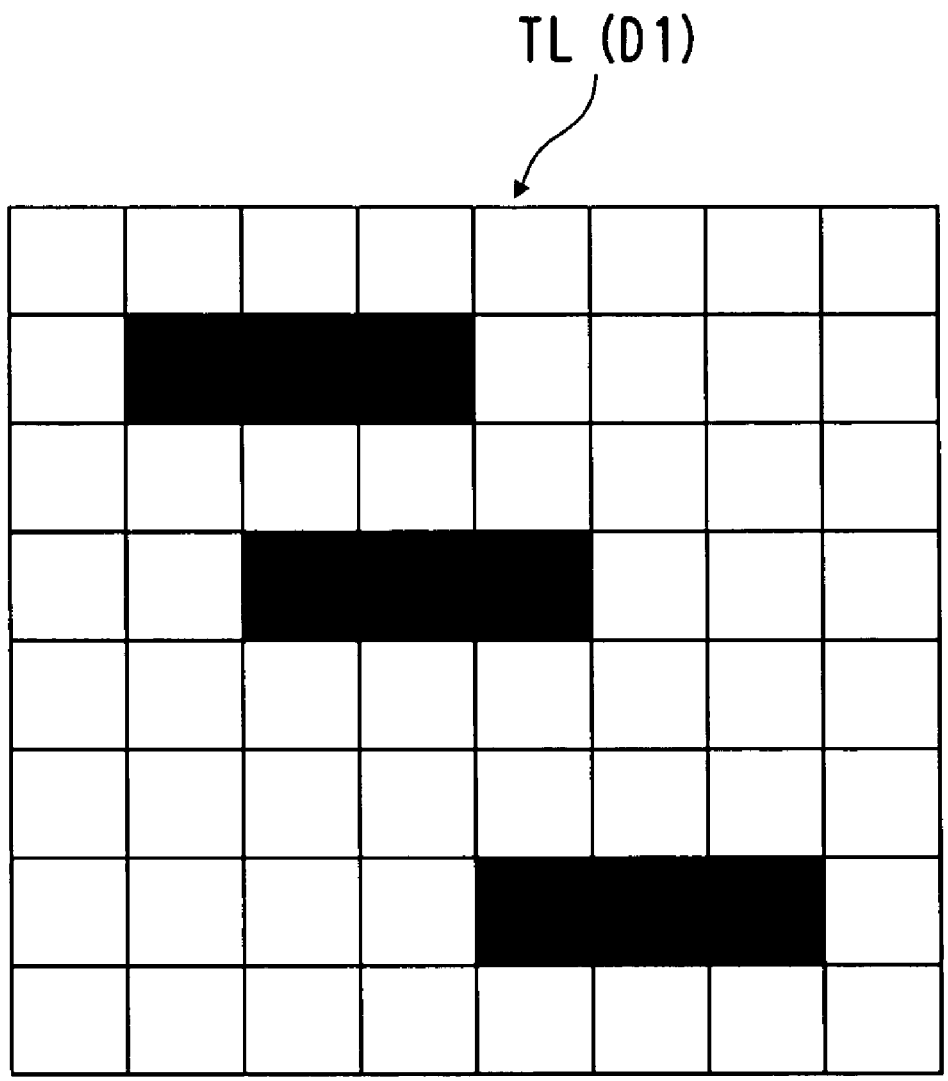
FIG. 23 is a diagram showing an example of a reproduced dot pattern.

FIGS. 22(a) and 22(b) are diagrams showing examples of an area TL and a dither pattern DP, FIG. 23 is a diagram showing an example of a reproduced dot pattern, and FIG. 24 is a diagram showing an example of a model data MD in the second example.

In the modeling process, the model data MD indicating characteristics of the image data FD are generated by modeling. On this occasion, initially, the image data FD to be compressed are divided into each area TL (corresponding to the "first step" in claims 19 and 20).

In this example, the area TL has a size of 64 pixels (8×8 pixels) as shown in FIG. 22(a). In FIG. 22(a), there is shown an arrangement pattern (a dot pattern) of dots of the pseudo gradation image that is obtained by performing the pseudo gradation process on the image data FD in this area TL by using the dither pattern DP shown in FIG. 22(b). Hereinafter, the dot pattern of the pseudo gradation image may be referred to as a "pseudo gradation image dot pattern".

In FIG. 22(a), black pixels in the area TL are dotted pixels. When a density value of each pixel in the image data FD is more than or equal to the threshold level of a corresponding pixel of the dither pattern DP shown in FIG. 22(b), the pixel is dotted. In other words, the larger the density value is, the higher the density is handled to be. Although the division is performed so that a size of the area TL becomes the same as a size of the dither pattern DP in the example shown in FIGS. 22(a) and 22(b), it is possible that these sizes are different from each other.

Next, a representative value of the partition area TL is determined. In this example, as the representative value of the partition area TL, the number of dots included in the partition area TL is used. Therefore, the representative value is "10" in the example shown in FIG. 22(a).

When the representative value of the partition area TL is determined, the representative value and a predetermined interpolation rule are used next for determining a density of each pixel included in the partition area TL, so that the virtual gradation image is generated (corresponding to the "second step" in claims 19 and 20).

In this example, when the noted area TL is noted, the representative value is used for determining a virtual mean value of the density values of pixels included in the noted area TL. Then, the image in the case where the density values in the noted area TL are uniformly equal to the virtual mean value is regarded as the virtual gradation image in the noted area TL.

In this example, a size of the partition area TL is 64 pixels (8×8 pixels). In this case, the number of dots (the representative value) can be regarded as a mean value of the density values in the partition area TL in the case where the image data FD have 64 gradation values. Therefore, it is possible to regard a value obtained by multiplying the representative value by 256/64 as a virtual mean value of the density values in the partition area TL in the case where the image data FD have 256 gradation values.

For example, if the representative value of the noted area TL is "10", the virtual mean value is "36" from the following equation.

10×256/64=36

The reproduced dot pattern can be obtained by performing the pseudo gradation by using the dither pattern DP on each density value in the noted area TL on the assumption that the density values in the noted area TL are uniformly equal to the above-mentioned virtual mean value. More specifically, the virtual mean value is compared with the density value of each pixel of the dither pattern DP, and the reproduced dot pattern is the dot pattern that is reproduced when dotting a pixel in which the virtual mean value is larger. If the virtual mean value is "36 when using the above-mentioned example, the reproduced dot pattern as shown in FIG. 23 is determined by the dither pattern DP shown in FIG. 22(b).

In parallel with the process for determining the reproduced dot pattern or before or after its timing, the pseudo gradation process is performed on the image data FD in the noted area TL by using the dither pattern DP so that the pseudo gradation image dot pattern is determined. Then, the determined reproduced dot pattern is compared with the pseudo gradation image dot pattern. If the reproduced dot pattern matches the pseudo gradation image dot pattern, the model data MD indicating the representative value of the noted area TL is generated.

If the reproduced dot pattern does not match the pseudo gradation image dot pattern, the model data MD is generated, which indicates the number of mismatching dots that is the number of dots that didn't match, the representative value of the noted area TL and the pseudo gradation image dot pattern of the noted area TL.

In the example shown in FIG. 22(a), the representative value of the pseudo gradation image dot pattern in the partition area TL is "10". This representative value and the dither pattern shown in FIG. 22(b) are used for determining the reproduced dot pattern, which becomes as shown in FIG. 23 as described above. In this case, therefore, the pseudo gradation image dot pattern is not equal to the reproduced dot pattern, and the number of mismatching dots becomes "1".

The above-mentioned process is performed for every partition area TL so that the model data MD of each partition area TL are generated. It is possible that the model data MD include other value for determining the representative value instead of the representative value. For example, a difference from the representative value of the partition area TL that is processed just before may be used.

Next, the model data MD in this example will be described with reference to FIG. 24. Here, the representative value, the pseudo gradation image dot pattern and the number of mismatching dots are referred to as a "representative value AP", a "pseudo gradation image dot pattern AR" and the "number of mismatch dots AN", respectively.

FIG. 24 shows the model data MD generated for the partition areas TL1, TL2, TL3, . . . and quantity of data (the number of bits) of each value that is an element of the model data MD. Concerning the partition area TL (the partition areas TL1, TL2 and TL3) in which the reproduced dot pattern matched the pseudo gradation image dot pattern AR, only the representative value AP is shown as the model data MD.

In addition, concerning the partition area TL (the partition area TL4 or the like) in which the reproduced dot pattern did not match the pseudo gradation image dot pattern AR, a switching flag AF ("F" in FIG. 24) that is a flag indicating mismatch, the representative value AP, the pseudo gradation image dot pattern AR ("D" in FIG. 24) and the number of mismatching dots AN are shown. Hereinafter, the partition area TL in which the reproduced dot pattern matched the pseudo gradation image dot pattern AR may be referred to as a "matched partition area TLx", while the partition area TL in which the reproduced dot pattern did not match the pseudo gradation image dot pattern AR may be referred to as a "mismatched partition area TLy".

The pseudo gradation image dot pattern AR is determined by scanning the partition area TL from the upper left end with a value of dotted pixels being set to "1" and a value of undotted pixels being set to "0", for example.

The quantity of data of each value indicated in the model data MD is shown on the line of "NUMBER OF BITS" in FIG. 24. In the partition area TL of 64 pixels as shown in FIGS. 22(a) and 22(b), possible values of the representative value AP are 0 to 64, which are total 65 values (7 bits). The switching flag AF is added to this representative value AP so as to be 66, and the representative value AP as well as the switching flag AF is expressed in 7 bits.

The pseudo gradation image dot pattern AR can be expressed with 64 bits for one partition area TL (64 pixels) since one pixel dot can be expressed with one bit.

The number of a possible value of a value for deriving the number of mismatching dots AN is 64 in the partition area TL of 64 pixels as shown in FIGS. 22(a) and 22(b), and it can be expressed with 6 bits.

The pseudo gradation image dot pattern AR in the partition area TL can be reconstructed by using the representative value AP in many cases as described above. If the number of mismatching dots is permitted to some extent, such partition areas TL further increase. Therefore, a quantity of data of 64 bits is decreased to a quantity of data of 7 bits for many partition areas TL, thereby a large quantity of data are reduced at the time point of the modeling process.

Furthermore, in this example, concerning this modeling process, the image data FD from which the model data MD have been generated are erased in succession from the memory area or the like to which the image data FD had been read as a compression target while the model data MD are generated from the image data FD. In other words, the process of converting the image data FD into the model data MD is performed.

[Thinning Process]

In the thinning process, some data are thinned out of the model data MD in accordance with the thinning threshold level MH. Here, the thinning threshold level MH is a value that indicates a degree of degradation of image quality that is permitted in the thinning process. In this example, the number of mismatching dots is used as an index of the degradation of image quality. Therefore, in this thinning process, when the noted area TL is concerned, it is determined which is used for generating the thinned data ED, the representative value or the pseudo gradation image dot pattern, in accordance with comparison between the number of mismatching dots included in the model data MD and the thinning threshold level MH. Then, the thinned data ED is generated by using the determined one. Note that this thinning threshold level MH is determined prior to the thinning process. This determining method will be described in detail below in [Thinning threshold level determination process].

When this process is performed, the model data MD for one partition area TL is read. If the read model data MD includes the switching flag, it means that the model data MD is data for the mismatched partition area TLy. In this case, the number of mismatching dots indicated in the model data MD is compared with the thinning threshold level MH.

If the number of mismatching dots is less than or equal to the thinning threshold level MH, the representative value indicated in the model data MD is used for generating the thinned data ED (corresponding to a "fourth step" and a "fifth step" in claims 19 and 20).

If the number of mismatching dots is larger than the thinning threshold level MH, the pseudo gradation image dot pattern indicated in the model data MD and the switching flag are used for generating the thinned data ED.

If the model data MD do not indicate the switching flag, it means that the model data MD is data for the matched partition area TLx. In this case, the representative value indicated in the model data MD is used for generating the thinned data ED.

According to the thinning process described above, the quantity of data in the model data MD is further reduced.

In addition, also in this thinning process, similarly to the modeling process, the thinned data ED are generated by the conversion process from the model data MD.

[Encoding Process]

Figure 26:
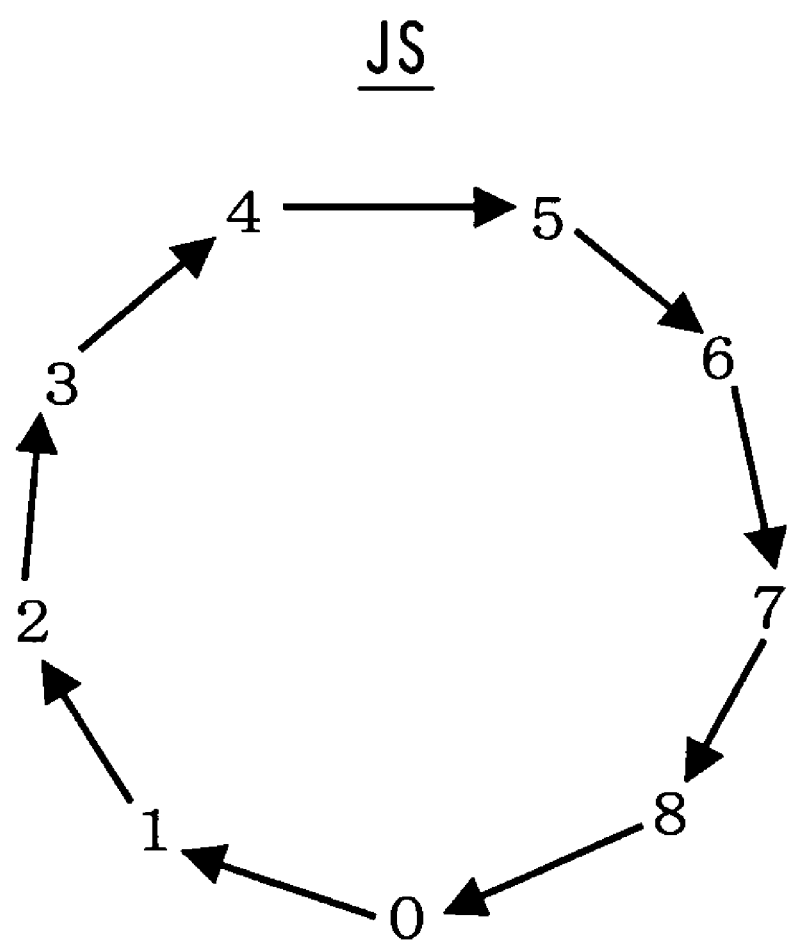
FIG. 26 is a diagram for explaining a circular integer.

FIG. 25 is a diagram showing an example of a code table FT1 about a difference of the representative value, and FIG. 26 is a diagram for explaining a circular integer.

In the encoding process, the compressed data D2 are generated by encoding the generated thinned data ED. More specifically, the encoding process is performed on the representative value indicated in the thinned data ED and the pseudo gradation image dot pattern. Concerning the representative value, a value for deriving the representative value for determining the representative value is determined first, and then it is encoded. In this example, as this value for deriving the representative value, concerning the noted area TL, a difference between the representative value of the noted area TL and the representative value of the immediately preceding partition area TL (a difference of the representative value) is used. If the thinned data ED of the immediately preceding partition area TL do not indicate the representative value, the difference is determined assuming that the representative value was zero. In other words, the difference in this case is the representative value itself of the noted area LT. Note that the immediately preceding partition area TL may be an area that is read immediately before the noted area TL in the modeling process (i.e., the left adjacent area) or an area for which the encoding process or the like is performed just before the noted area TL.

In this example, in order to express the difference of the representative value, a method of circular integer shown in FIG. 26 is used. Here, this circular integer will be described in brief.

FIG. 26 shows a circle JS for explaining the method of circular integer. A position of a certain number A is a reference point. In order to determine a difference C between the number A and another number B, the circle JS is rotated in the left direction from the position of the number A by the number of positions corresponding to the number B in the circle JS, and a value that stops at the position of the reference point is the difference C. For example, a difference between "5" and "3" can be determined by regarding the position of "5" as the reference point and rotating the circle JS in the left direction by three in the circle JS. The number "2" that comes to the position of the reference point is the answer. In another example, a difference between "0" and "8" can be determined by regarding the position of "0" as the reference point and rotating the circle JS in the left direction by eight in the circle JS. The number "1" that comes to the position of the reference point is the answer. In this way, a difference is obtained as an integer within the range of 0-8.

In addition, a number A can be determined by adding a difference C to a number B. In this case, a position of the number B in the circle JS is the reference point, and the circle JS is rotated in the right direction by the number of positions corresponding to the difference C. Then, a value that comes to the position of the reference point is the number A. In this way, the number A can be reconstructed completely from the number B and the difference C.

Since the maximum value of the representative value is "64", a range of the difference of the representative value is usually from "−64" to "64". By using the method described above, this range can be converted into the range from "−32" to "32". In this example, the difference of the representative value from "−32" to "32" determined as described above is encoded by using the code table FT1 shown in FIG. 25.

In FIG. 25, the code table FT1 includes items of a "difference of the representative value", a "code" and the "number of additional bits". The "difference of the representative value" indicates one or more differences of the representative value to be encoded. The "code" indicates a leading portion of a code assigned to the difference of the representative value of the corresponding line. The "number of additional bits" indicates the number of bits in a trailing portion of the code assigned to the difference of the representative value of the corresponding line.

If a third line of the code table FT1 is exemplified, the code of "011" is assigned to the first three bits of the code for each of the differences of the representative value "−3", "−2", "2" and "3". In addition, a code of two bits indicated in the "number of additional bits" is added to the trailing portion. Here, the code is assigned in the ascending order from the smallest difference value. More specifically, the codes of "01100", "01101", "01110" and "01111" are assigned to the differences of the representative value "−3", "−2", "2" and "3", respectively. The switching flag described above in the modeling process is assigned with a code of the last line in a representative value encoding table. The difference of the representative value can be expressed in 2-9 bits according to the encoding process described above.

Since the representative value is a value having a relationship with a density of the image, there is a close connection between representative values of neighboring partition areas TL. The representative values of such partition areas TL are close to each other. In other words, a difference of density between neighboring partition areas TL is small, and therefore a difference of the representative value is small. Therefore, a difference between a current representative value of a certain partition area TL and an immediately preceding representative value of the partition area TL becomes zero in many cases. Therefore, in many cases, the difference of the representative value can be expressed in two bits. As a whole, a length of the code becomes approximately four bits in average. Since the maximum value of the representative value is 64 that is a 6-bit quantity of data, approximately one-bit quantity of data is reduced in average for one partition area TL by this encoding process.

In addition, as a bias of a statistical appearance frequency with respect to the difference of the representative value between neighboring partition areas TL increases, it is effective to use the Huffman method for the encoding process.

As to the pseudo gradation image dot pattern, the encoding process is performed by a predetermined encoding method. In this embodiment, a dot pattern indicated in a line is encoded for each of the partition areas TL. Thus, the pseudo gradation image dot pattern of one partition area TL can be expressed in a code length of approximately 30 bits in average. Since a quantity of data in a pseudo gradation image dot pattern of 64 pixels is 64 bits, thus a quantity of data of approximately 30 bits in average can be reduced.

Although here is described an example of the case where a difference of the representative value is encoded, it is possible to encode the representative value as it is.

In addition, also in this encoding process, similarly to the modeling process, the compressed data D2 are generated by the conversion from the thinned data ED.

[Thinning Threshold Level Determination]

The thinning threshold level MH is determined by using the model data MD generated by the modeling process. More specifically, a trial calculation is performed about a quantity of data in the entire compressed data D2 generated by the thinning process in which data are thinned out from the model data MD in accordance with a thinning threshold level MH, so as to determine a thinning threshold level MH such that the quantity of data becomes less than a target quantity of data GL. The determined value is adopted as the thinning threshold level MH (corresponding to a "third step" in claims 19 and 20).

As to the matched partition area TLx, a quantity of data can be reduced substantially by expressing the pseudo gradation image dot pattern (64 bits) using the representative value (7 bits).

As to the mismatched partition area TLy, image quality is degraded when the representative value is used for expressing the pseudo gradation image dot pattern. However, since the partition area TL is sufficiently small, the degradation is not so conspicuous. For this reason, sufficient image quality can be maintained even if the pseudo gradation image dot pattern is expressed by using the representative value while permitting a mismatch to some extent between the reproduced dot pattern and the pseudo gradation image dot pattern. Therefore, a quantity of data can be reduced substantially by using the representative value also for the mismatched partition area TLy if some degradation of image quality is permitted.

When the thinning threshold level MH is determined, a quantity of data in the compressed data D2 is calculated in trial. Then, the number of mismatching dots to be permitted for making the quantity of data smaller than the target quantity of data GL is determined. The determined number is adopted as the thinning threshold level MH.

FIG. 27 is a diagram showing an example of statistical data TK. Next, a method for calculating in trial a quantity of data in the compressed data D2 by using the statistical data TK will be described.

First, a quantity of data in the thinned data ED is calculated in trial. On this occasion, a quantity of data in the case where the thinned data ED is generated by setting the thinning threshold level MH to "0" is calculated in trial first.

According to the example shown in FIG. 24, a quantity of data in the model data MD in the matched partition area TLx is 7 bits. Since the representative value indicated in the model data MD is used for the thinned data ED as they are for the matched partition area TLx, the quantity of data is kept in 7 bits. In this case, the quantity of data in the thinned data ED can be further reduced to approximately four bits by the encoding process.

A quantity of data in the model data MD for the mismatched partition area TLy is 84 bits (7+7+64+6 bits). As to the mismatched partition area TLy, the representative value is used for generating the thinned data ED if the number of mismatching dots is less than or equal to the thinning threshold level MH. Therefore, a quantity of data after the encoding process becomes approximately four bits similarly to the matched partition area TLx.

In addition, if the number of mismatching dots is larger than the thinning threshold level MH, the switching flag (7 bits) and the pseudo gradation image dot pattern (64 bits) are used for generating the thinned data ED. Therefore, a quantity of data in the thinned data ED becomes 71 bits, and it further becomes 33 bits [a quantity of data in the pseudo gradation image dot pattern (approximately 30 bits) plus a quantity of data in the switching flag (3 bits)] by the encoding process.

If the thinning threshold level MH is "0", the number of mismatching dots is always larger than the thinning threshold level MH. Therefore, as to the mismatched partition area TLy, a quantity of data in the compressed data D2 becomes approximately 33 bits. As to the matched partition area TLx, a quantity of data in the compressed data D2 is approximately four bits as described above. Therefore, a total quantity of data in the compressed data D2 in all partition areas TL can be calculated in trial by the following equation (2).

A total quantity of data=(the number of matching partition areas $TLx$)×4+(the number of mismatching partition areas $TLy$)×33    (2)

The numbers of the matched partition area TLx and the mismatched partition area TLy can be known easily by generating statistical data together with the modeling process. The statistical data will be described in detail later.

If the quantity of data calculated in the way described above is smaller than the target quantity of data GL, the thinning threshold level MH is determined to be "0". On the contrary, if it is larger than the target quantity of data GL, a quantity of data in the compressed data D2 in the case where the thinning process is performed by a larger value of the thinning threshold level MH is calculated in trial.

When such a quantity of data is calculated in trial, it is determined first how much quantity of data are reduced by increasing the thinning threshold level MH. If the thinning threshold level MH is increased, the representative value is adopted instead of the pseudo gradation image dot pattern for generating the thinned data ED in the mismatched partition area TLy in which the number of mismatching dots becomes smaller than the thinning threshold level MH. When the number of mismatching partition areas TLy is represented by "N", a quantity of data that can be reduced by increasing the thinning threshold level MH can be determined from the following equation (3).

$$A \text{ quantity of data} = N \times (33-4) \quad (3)$$

In order to know the number of mismatching partition areas TLy with respect to the number of mismatching dots, it is necessary to obtain the statistical data as shown in FIG. 27 in the stage of the modeling process.

In FIG. 27, each line indicates the number of mismatching partition areas TLy corresponding to the number of mismatching dots as the "number of areas". As to the statistical data TK, the number of areas with respect to the number of mismatching dots is incremented when the number of mismatching dots is determined in the partition area TL that was an object of the modeling process. Such processes are performed on every partition area TL.

According to the example shown in FIG. 27, the number of partition areas TL in which the number of mismatching dots is "0" is 21781. The number of partition areas TL in which the number of mismatching dots is "1" is 9720, and the number of partition areas TL in which the number of mismatching dots is "2" is 4413, which are included in the pseudo gradation image data FG.

A quantity of data in the compressed data D2 in the case where the thinning threshold level MH is increased can be calculated in trial by subtracting the quantity of data obtained by the expression (3) from the quantity of data in the compressed data D2 that is calculated in trial by setting the thinning threshold level MH to "0". Then, a value of the thinning threshold level MH when the trail calculated quantity of data is less than or equal to the target quantity of data GL is adopted as the thinning threshold level MH that is used for the actual thinning process.

FIGS. 28(*a*) and 28(*b*) are diagrams showing a relationship between a thinning threshold level MH and a quantity of the compressed data D2.

In this example, a total quantity of data in the compressed data D2 is calculated in trial supposing that an average code length is approximately four bits in the case where the encoding table shown in FIG. 25 is used for encoding the difference of the representative value. Then, the thinning threshold level MH is determined. Instead, it is possible to use a graph as shown in FIGS. 28(*a*) and 28(*b*) for determining the thinning threshold level MH.

FIG. 28(*a*) shows a curve C1 and a curve C2 that are graphs indicating relationships between a quantity of data in the compressed data D2 and an appearance frequency of the code, a code length (a bit length) of the code as well as the thinning threshold level MH. The curve C1 corresponds to the case where a mismatch between the pseudo gradation image dot pattern and the reproduced dot pattern is not permitted. The curve C2 corresponds to the case where a mismatch between the pseudo gradation image dot pattern and the reproduced dot pattern is permitted. In addition, the y-axis of this graph indicates a product of the code length and the appearance frequency. The x-axis indicates a thinning threshold level MH.

Here, the area S1 of a region enclosed by the curve C1, the straight line L1, the x-axis and the y-axis becomes a quantity of data in the compressed data D2 in the case where the thinning threshold level MH is set to "0".

If the thinning threshold level MH is increased, a quantity of data in the compressed data D2 is changed to a value of the area S2 in the region indicated with hatching in FIG. 28(*b*).

Therefore, a straight line L2 such that the area S2 becomes less than the target quantity of data GL is determined so that a value x1 at a point of intersection of the straight line L2 and the x-axis is determined to be the thinning threshold level MH.

[Expansion Process]

In the expansion process, initially the thinned data ED are reconstructed by decoding the compressed data D2 in accordance with the code table FT1.

When the pseudo gradation image data D1 in each partition area TL are reconstructed from the thinned data ED, if the noted area TL is concerned and the thinned data ED in the noted area TL includes the switching flag, the pseudo gradation image dot pattern is extracted from the thinned data ED to be the dot pattern of the noted area TL.

If the thinned data ED in the noted area TL does not include the switching flag, a difference of the representative value is extracted from the thinned data ED, thereby the representative value of the noted area TL is determined. A dot pattern of the noted area TL is generated by using the representative value and the dither pattern that is used for the pseudo gradation process when the pseudo gradation image data D1 of the compressed data D2 are generated. Note that the dither pattern may be stored in advance in a memory or the like of the printer 13 that performs the expansion process or a dither pattern corresponding to the compressed data D2 may be sent from the computer main body 11 together with the compressed data D2.

The representative value of the noted area TL can be obtained by summing the representative value of the immediately preceding partition area TL of the noted area TL and this difference of the representative value. If the representative value is not used for reconstructing the dot pattern of the immediately preceding partition area TL, i.e., if the dot pattern is reconstructed by using the pseudo gradation image dot pattern included in the thinned data ED, the representative value in the immediately preceding partition area TL is regarded as "0" for the calculation. In this case, therefore, the representative value of the noted area TL becomes the difference of the representative value itself. As to the partition area TL in which the number of mismatching dots was determined to be less than or equal to the thinning threshold level MH in the thinning process, the dot pattern of the partition area TL is reconstructed by using the representative value approximately.

The processes described above are performed for every partition area TL, and thus a dot pattern of the entire pseudo gradation image data D1 is generated.

[Description with Reference to Flowcharts]

Figure 29:
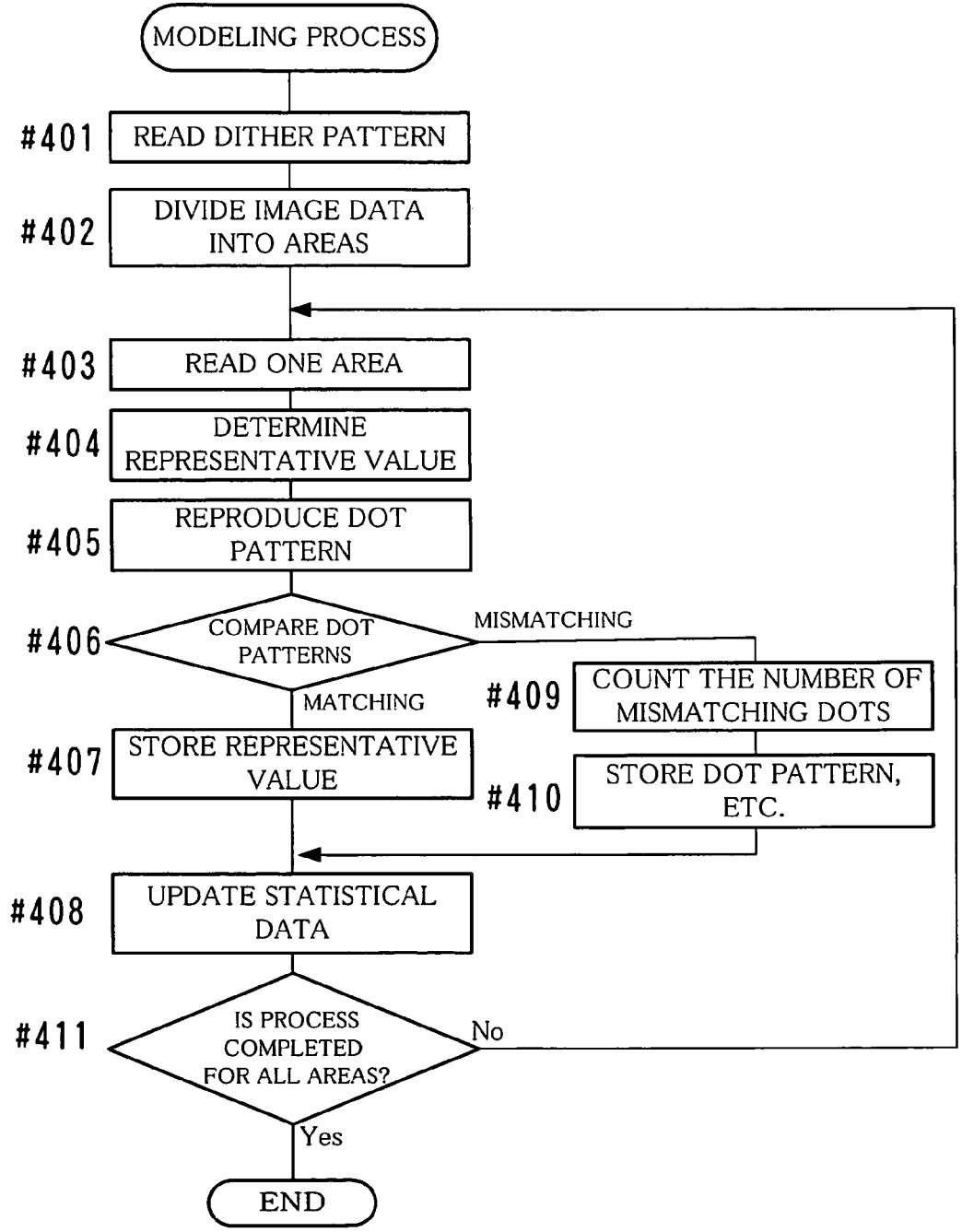
FIG. 29 is a flowchart for explaining a flow of a modeling process.
Figure 30:
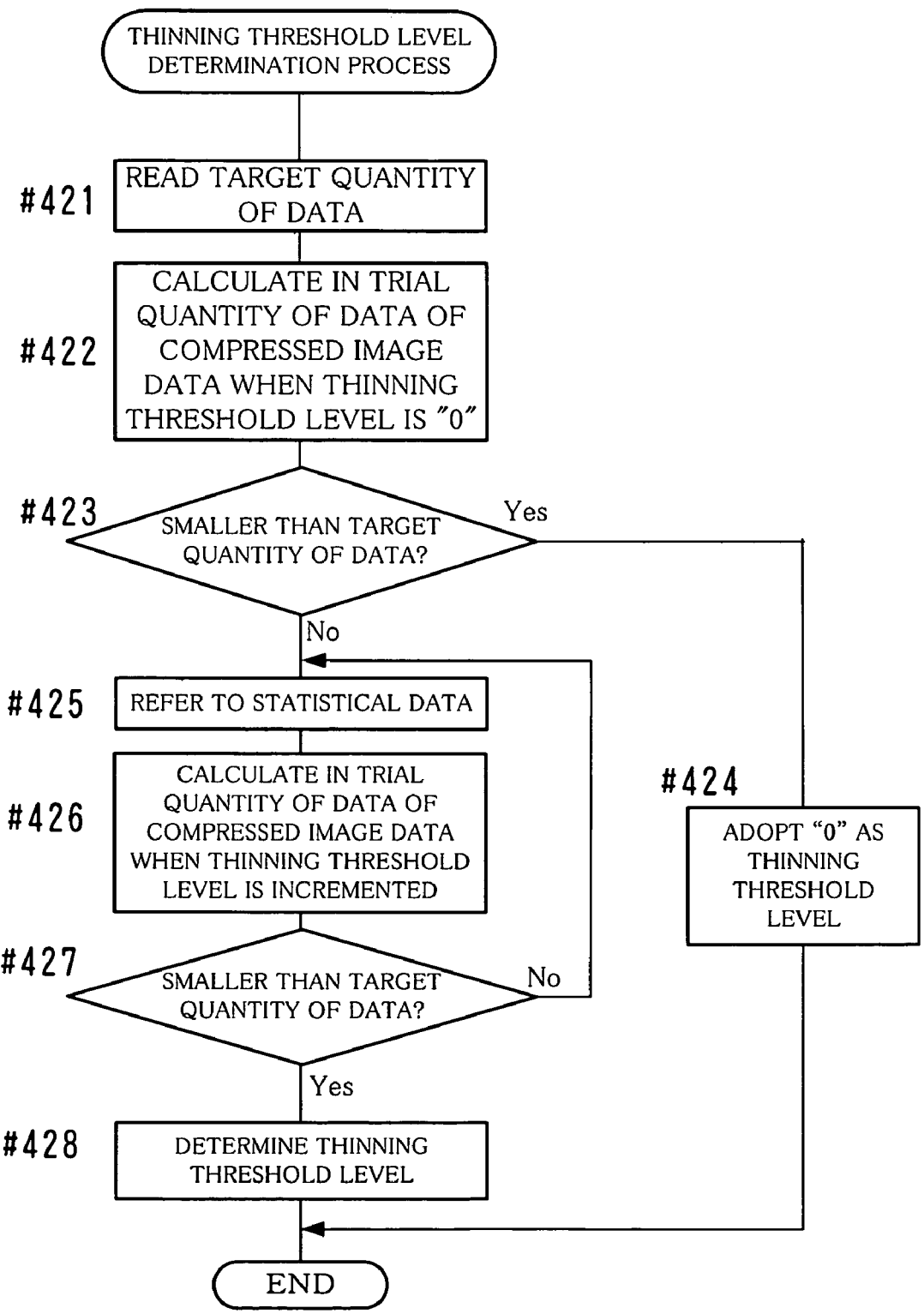
FIG. 30 is a flowchart for explaining a flow of a process for determining the thinning threshold level.
Figure 31:
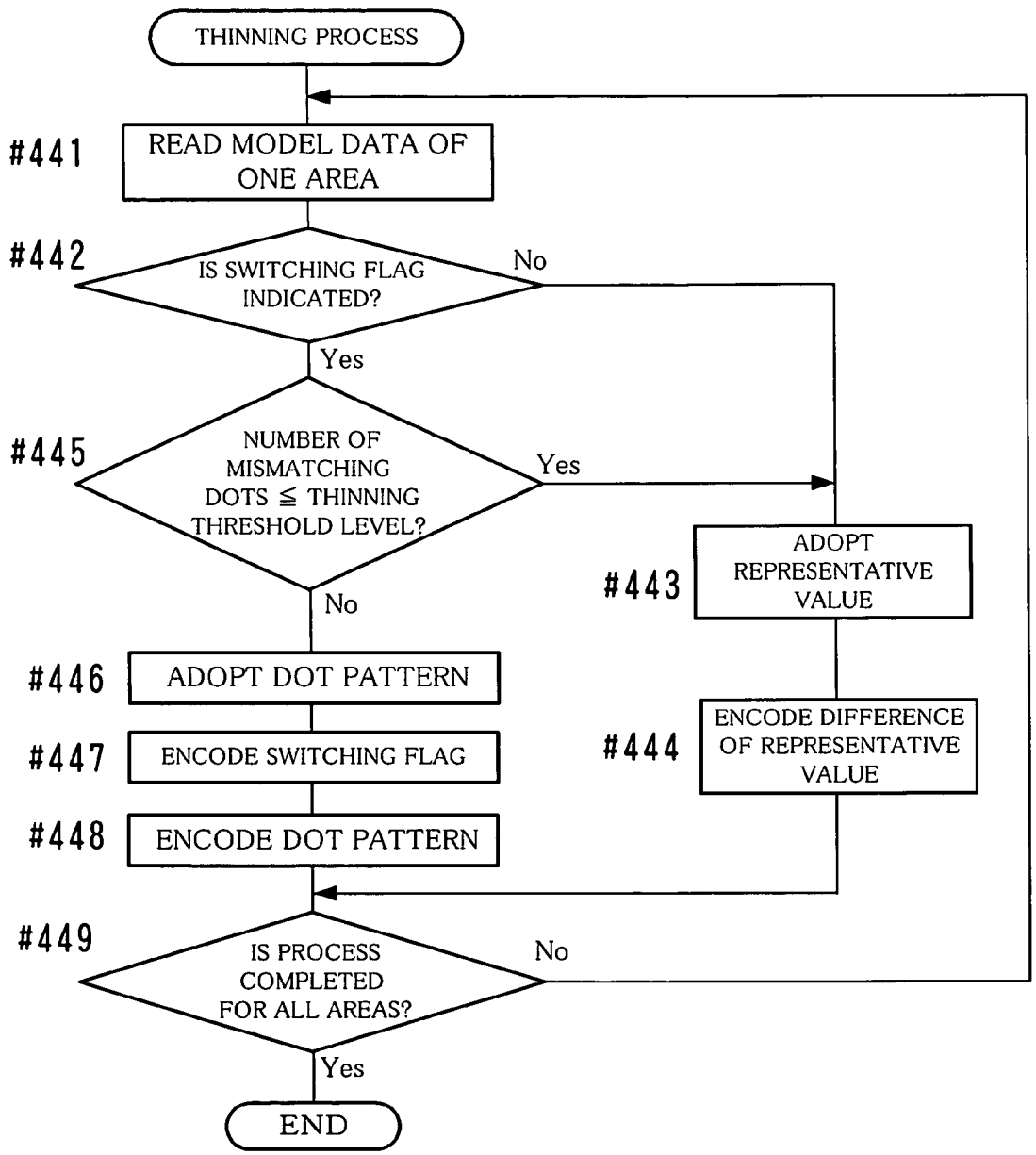
FIG. 31 is a flowchart for explaining a flow of a thinning process.
Figure 32:
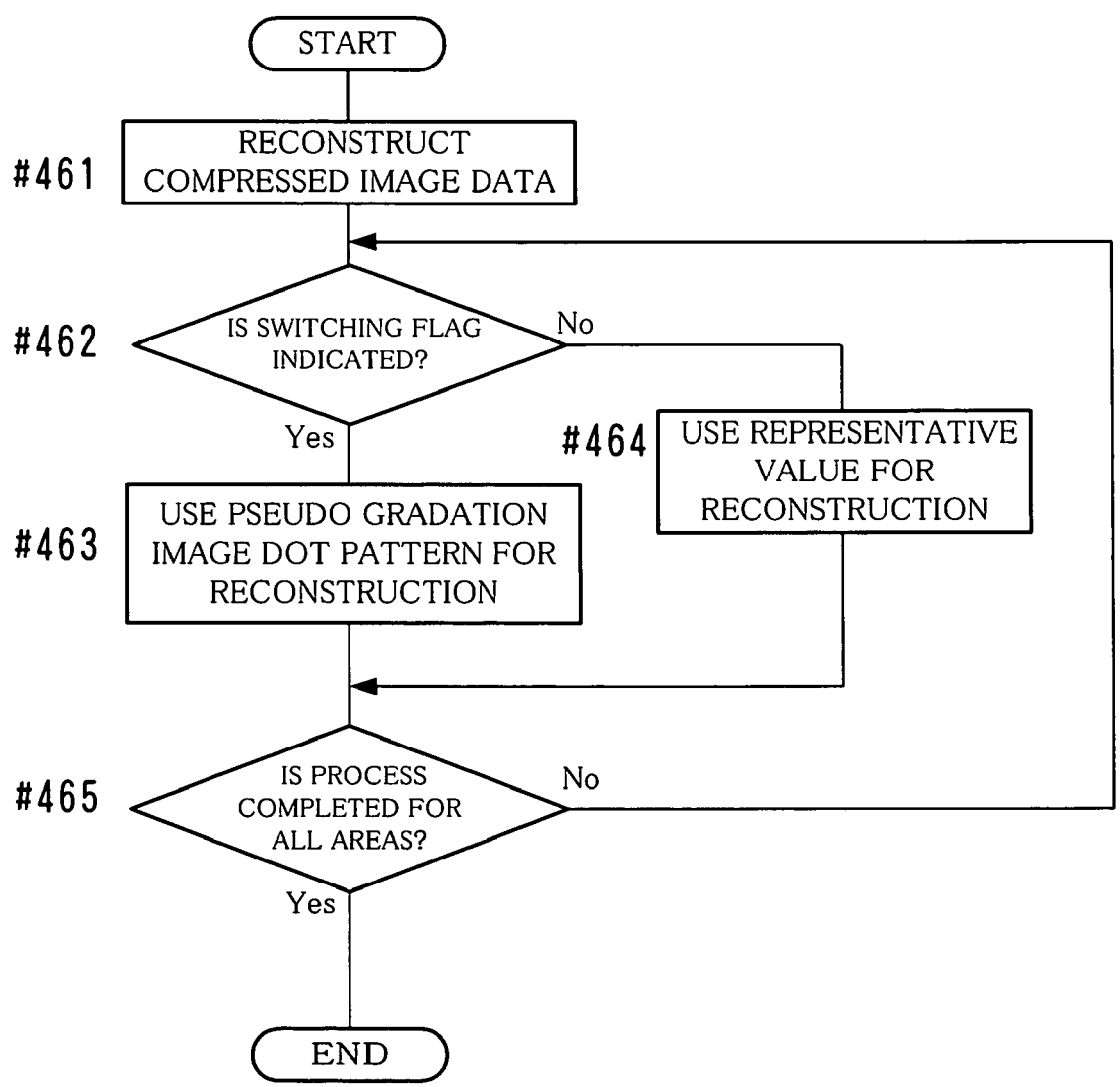
FIG. 32 is a flowchart for explaining a flow of an expansion process in the second example.

FIG. 29 is a flowchart for explaining a flow of a modeling process, FIG. 30 is a flowchart for explaining a flow of a process for determining the thinning threshold level, FIG. 31 is a flowchart for explaining a flow of a thinning process, and FIG. 32 is a flowchart for explaining a flow of an expansion process in the second example. Next, a flow of the modeling process in this example will be described with reference to the flowchart shown in FIG. 29.

In FIG. 29, initially, a dither pattern DP that is used for the pseudo gradation process performed on image data FD to be compressed is read (#401). The image data FD to be compressed are divided into predetermined areas (#402). A partition area TL on which the modeling process is performed is read (#403). After counting the number of dots of the pseudo gradation image dot pattern in the partition area TL that is generated by using the dither pattern DP that is read in the step #401, the number is determined to be the representative value of the partition area TL (#404). The determined representative value and a predetermined interpolation rule are used for generating a virtual gradation image, and the dither pattern DP that is read in the step #401 is used for the pseudo gradation process of the virtual gradation image so that the dot pattern in the partition area TL is reproduced (#405).

The reproduced dot pattern is compared with the pseudo gradation image dot pattern of the partition area TL. If they match each other ("matching" in #406), the representative value determined in the step #404 is stored as the model data MD of this partition area TL (#407). The statistical data TK are updated so as to increment the number of partition areas TL in which the number of mismatching dots is "0" (#408).

If the reproduced dot pattern does not match the pseudo gradation image dot pattern of the partition area TL ("mismatching" in #406), the number of mismatching dots is counted (#409). Further, the representative value determined in the step #404, the number of mismatching dots determined in the step #407, the pseudo gradation image dot pattern in this partition area TL and the switching flag are stored as the model data MD of this partition area TL (#410). The statistical data TK are updated so as to increment the number of partition areas TL whose number of mismatching dots is equal to the number of mismatching dots calculated in the step #409 (#408).

If there are remaining partition areas TL on which the modeling process was not performed ("No" in #411), the process of #403 and the following steps is repeated for such partition areas TL.

If the modeling process is completed for every partition area TL ("Yes" in #411), the modeling process is finished.

Next, a flow of the process for determining the thinning threshold level in this example will be described with reference to the flowchart shown in FIG. 30.

In FIG. 30, the target quantity of data GL is read (#421). A total quantity of data of the compressed data D2 in the case where the thinning threshold level MH is set to "n" are calculated in trial from the model data MD generated in the modeling process (#422).

If the quantity of data calculated in trial is smaller than the target quantity of data GL ("Yes" in #423), the thinning threshold level MH is determined to be a value "0" (#424).

If the quantity of data calculated in trial is larger than or equal to the target quantity of data GL ("No" in #423), the statistical data TK are referred to (#425), and the compressed data D2 in the case where the thinning threshold level MH is incremented is calculated in trial (#426).

If the quantity of data calculated in trial is smaller than the target quantity of data GL ("Yes" in #427), the thinning threshold level MH that was used for the calculation in trial is determined to be the thinning threshold level MH that is used for an actual thinning process (#428).

If the quantity of data calculated in trial is larger than or equal to the target quantity of data GL in the step #426 ("No" in #427), the process of #425 and the following steps is repeated.

Next, a flow of the thinning process in this example will be described with reference to the flowchart shown in FIG. 31. Here, it is supposed that the encoding process is performed in this thinning process.

In FIG. 31, the model data MD of one area is read (#441). If the model data MD does not indicate the switching flag ("No" in #442), it is determined that the representative value indicated in the model data MD is encoded (#443). Further, a difference value between the representative value and a representative value of the partition area TL that was processed just before is determined and encoded (#444).

If the switching flag is indicated in the model data MD in the step #441 ("Yes" in #442), the number of mismatching dots indicated in the model data MD is compared with the thinning threshold level MH (#445).

If the number of mismatching dots is less than or equal to the thinning threshold level MH ("Yes" in #445), the process of #443 and the following steps is performed.

If the number of mismatching dots is larger than the thinning threshold level MH ("No" in #445), it is determined that the pseudo gradation image dot pattern indicated in the model data MD is encoded (#446). The pseudo gradation image dot pattern and the switching flag are encoded (#447 and #448).

If there are remaining partition areas TL on which the thinning process has not been performed ("No" in #449), the process of the step #441 and the following steps is repeated for such partition areas TL.

If the thinning process is completed for every partition area TL ("Yes" in #449), the process is finished.

The compressed data D2 generated in this way are sent from the computer main body 11 to the printer 13 and expanded in the printer 13.

Next, a flow of the expansion process in this example will be described with reference to a flowchart shown in FIG. 32.

In the expansion process, initially, the compressed data D2 are decoded in accordance with the code table FT1, so that the thinned data ED are reconstructed (#461). As to the partition area TL in which the thinned data ED include the switching flag ("Yes" in #462), the pseudo gradation dot pattern that is included in the thinned data ED is used for reconstructing the pseudo gradation image data D1 (#463).

As to partition areas TL in which the thinned data ED do not include the switching flag ("No" in #462), the representative value is determined from the value for deriving the representative value included in the thinned data ED. Then, by using the representative value and the dither pattern DP, the pseudo gradation image data D1 are reconstructed or approximately reconstructed (#464).

If the reconstruction of the pseudo gradation image data D1 is not completed for every partition area TL ("No" in #465), the process of the step #462 and the following steps is repeated.

If the reconstruction of the pseudo gradation image data D1 is completed for every partition area TL ("Yes" in #465), the process is finished. After that, the printer 13 performs the printing process in accordance with the reconstructed or approximately reconstructed pseudo gradation image data D1.

In the flowcharts described above, the step #402 in FIG. 29 corresponds to the "first step" in claims 19 and 20, the step #405 in FIG. 29 corresponds to the second step", the step #428 in FIG. 30 corresponds to the "third step", the step #443 in FIG. 31 corresponds to the "fourth step", and the step #444 in FIG. 31 corresponds to the "fifth step".

According to this example, a quantity of data is reduced from ½ to 1/10 approximately in the modeling process and further reduced from 1/10 to 1/200 approximately in the thinning process. The quantity of data that is reduced in the thinning process is adjusted by the thinning threshold level MH. Then, the image data FD to be compressed are compressed so as to be smaller than the target quantity of data GL and to be close to the same. Thus, the best image quality in the case where the quantity of data after the compression becomes less than the target quantity of data GL can be secured, so that compression performance can be maintained.

In the conventional method for compressing image data, a test compression process is performed for determining an optimal compression parameter (the thinning threshold level MH) so that a quantity of data after the compression becomes smaller than the target quantity of data. Alternatively, the compression process and the expansion process are repeated while altering the compression parameter as necessity until the quantity of data becomes smaller than the target quantity of data. In any case, according to these conventional methods, it is necessary to secure a memory area for keeping data generated in the compression process and the original image data.

In accordance with this example, however, the quantity of data is calculated in trial in accordance with the model data MD, thereby the thinning threshold level MH is determined. In addition, the compressed data D2 to be generated finally are generated from the model data MD via the thinned data ED. Therefore, only maintaining the model data MD makes it possible to realize the compression process that can suppress the quantity of data in the target quantity of data. It is not necessary to secure an extra memory area as the conventional methods. Further, in many cases, a quantity of data in the model data MD can be substantially smaller than the image data FD or the pseudo gradation image data D1. For these reasons, the memory area that is necessary for the compression process can be reduced substantially compared with the conventional methods.

In addition, a quantity of data to be kept becomes smaller as the process goes on in the steps for generating the compressed data D2 from the modeling process via the thinning process. Therefore, the method in this example is further preferable for saving the memory area.

In addition, the thinning threshold level MH can be determined promptly by calculating in trial a quantity of data in the compressed data D2. This quantity of data can be calculated in trial by a simple calculation process. Therefore, by using the compression method of this example, it is possible to realize a higher process than the conventional methods.

Further, in this example, a sufficient compressibility can be obtained also at the time point of the thinning process, so it is possible to reduce the quantity of data after the compression to a value less than the target quantity of data GL even if the encoding process is omitted. In this way, by omitting the encoding process and performing a two-stage compression of the modeling process and the thinning process, process efficiency can be further improved.

In this example, a quantity of data in the compressed data D2 is calculated in trial by using first the thinning threshold level MH in the case where least data are thinned out by the thinning process. Then, a value of the thinning threshold level MH is increased step by step, so as to determine the thinning threshold level MH at which the quantity of data calculated in trial is less than the target quantity of data GL. Instead, it is possible to use first the thinning threshold level MH that permits degradation of image quality to some extent and the thinning threshold level MH is increased step by step from the level MH used first. Thus, it is possible to find faster a thinning threshold level MH at which a quantity of data in the compressed data D2 becomes less than the target quantity of data GL, so that a process time can be shortened. This method is effective in particular if the target quantity of data GL is set to a relatively small value.

In the thinning process of this example, a quantity of data is reduced by discriminating unnecessary information from necessary information and removing the unnecessary information in accordance with the thinning threshold level MH. Therefore, this process can be called a "selection process". A thinning threshold level MH that is used for the process can be called a "criterion value".

Further, in the process for determining the thinning threshold level, it is determined how much extent a degradation of image quality is permitted in the compression process, i.e., how much accuracy the image data are reconstructed by determining the thinning threshold level MH. Therefore, this process can be called an "accuracy determining process".

In this example, when each of data such as the model data MD is generated, the original for the generation are removed from the memory area. However, if there is a large memory capacity for ensuring sufficient vacant memory area, it is not necessary to remove them.

In this example, the thinning threshold level MH is determined by calculating in trial a quantity of data in the compressed data D2. It is possible to determine this by calculating in trial a quantity of data in the thinned data ED.

In this example, for simple description, the compression process is described after divided into the modeling process, the thinning process and the encoding process. The contents of the processes can be modified or combined in accordance with the spirit of the present invention.

In addition, the various data including the model data MD in this example may be data generated with respect to the entire image data FD or data of an individual part corresponding to the partition area TL.

In this embodiment, each process is performed on the image data FD for each partition area TL. It is possible to perform the process for a band that is a sequential set of partition areas TL of one line. In this way, when the process is performed for each partition area TL or each band, the printer 13 can perform a band process that is a process of printing each band.

In addition, it is possible to perform the compression process according to this embodiment in the printer 13. Thus, for example, the compression method according to this embodiment can be applied to data of an original read in a copy process in the case of a type having a copy function.

Furthermore, the structure, the function, the number of a whole or a part of the computer main body 11, the printer 13 and the print system 1, the number of bits, the method of calculating in trial a quantity of data, the contents or the order of the process can be modified if necessary in accordance with a spirit of the present invention.

The present invention can be used as a compression method for compressing and sending gradation image data to a printer in a print system including a raster printer or a GDI printer.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method performed in a computer for compressing image data having a gradation property, the method comprising the following steps:
   a first step for dividing the image data into predetermined areas, so as to determine a representative value of densities of pixels in each area;
   a second step for determining a density of each pixel included in the area using the representative value of the area and an interpolation rule;
   a third step for testing reproducibility of an image obtained on the basis of the density of each pixel determined in the second step, by using the image data and a dither pattern that is used for a pseudo gradation step performed on the image data; and
   a fourth step for performing an encoding process on the basis of the representative value determined in the first step for areas where the reproducibility was good in the test of the third step,
   wherein the representative value is a value between a minimum value K of a threshold value in the case where a threshold value of the dither pattern is larger than a density value of the image data and a maximum value J of a threshold value in the case where a threshold value of the dither pattern is smaller than a density value of the image data,
   Wherein each step is performed by said computer.

2. The method according to claim 1, wherein the image that is obtained on the basis of the density of each pixel is a virtual gradation image on the basis of the density of each pixel.

3. The method according to claim 1, wherein the image obtained on the basis of the density of each pixel is a pseudo gradation image that is obtained by a pseudo gradation process on the virtual gradation image on the basis of the density of each pixel using the dither pattern.

4. The method according to claim 1, wherein the representative value is a density value of a specific pixel in the area.

5. The method according to claim 1, wherein the representative value is an intermediate value of density values of a plurality of pixels in the area.

6. The method according to claim 1, wherein the representative value is an intermediate value of density values of a specific pixel and pixels surrounding the specific pixel in the area.

7. The method according to claim 1, wherein the interpolation rule is a process in which the density value of each pixel included in the area is equal to the representative value of the area.

8. The method according to claim 1, wherein the interpolation rule is a process of obtaining the density value of each pixel included in the area by interpolation using a representative value of the area and representative values of one or more neighboring areas of the area.

9. The method according to claim 8, wherein the interpolation is a linear interpolation.

10. The method according to claim 8, wherein the interpolation is a spline interpolation.

11. The method according to claim 1, wherein the encoding process is performed by determining difference information between representative values of neighboring areas and encoding the determined difference information.

12. The method according to claim 1, wherein the encoding process is performed on the basis of the image data in an area where reproducibility was not good in the test of the third step.

13. A method performed in a computer for compressing image data having a gradation property, the method comprising the following steps:
   a first step for dividing the image data into predetermined areas, so as to determine a representative value of densities of pixels in each area;
   a second step for determining a density of each pixel included in the area using the representative value of the area and an interpolation rule;
   a third step for testing reproducibility of an image obtained on the basis of the density of each pixel determined in the second step, by using the image data and a dither pattern that is used for a pseudo gradation step performed on the image data; and
   a fourth step for performing an encoding process on the basis of the representative value determined in the first step for areas where the reproducibility was good in the test of the third step,
   wherein, in the third step, an error range in a case where the image data are character image data is set smaller than an error range in a case where the image data are picture image data when the reproducibility is tested,
   Wherein each step is performed by said computer.

14. A method performed in a computer for compressing image data having a gradation property, the method comprising the following steps:
   a first step for dividing the image data into predetermined areas, so as to determine a representative value of densities of pixels in each area;
   a second step for determining, for each area, a density of each pixel included in the area using the representative value of the area and an interpolation rule;
   a third step for comparing a first dot pattern that is an arrangement pattern of dots obtained by performing a pseudo gradation process on the image data using a dither pattern with a second dot pattern that is an arrangement pattern of dots obtained by performing a pseudo gradation process on a density of each pixel determined in the second step using the dither pattern so as to determine a mismatch value indicating a difference between the first dot pattern and the second dot pattern, and for determining whether or not to use the representative value obtained in the first step for a process for generating compressed data on the basis of the mismatch value and a predetermined criterion value; and
   a fourth step for performing the process for generating the compressed data by using the representative value if it was determined that the representative value should be used for generating the compressed data,
   Wherein each step is performed by said computer.

15. A method performed in a computer for compressing image data having a gradation property, the method comprising the following steps:
   a first step for dividing the image data into predetermined areas, so as to determine a representative value of densities of pixels in each area;
   a second step for determining, for each area, a density of each pixel included in the area using the representative value of the area and an interpolation rule;
   a third step for comparing a first dot pattern that is an arrangement pattern of dots obtained by performing a pseudo gradation process on the image data using a dither pattern with a second dot pattern that is an arrangement pattern of dots obtained by performing a pseudo gradation process on a density of each pixel determined in the second step using the dither pattern so as to determine a mismatch value indicating a difference between the first dot pattern and the second dot pattern, and for determining for each area whether or not to use the representative value obtained in the first step for a process for generating compressed data on the basis of the mismatch value and a predetermined criterion value; and a fourth step for performing the process for generating the compressed data by using the representative value of an area where it was determined to use the representative value for generating the compressed data, Wherein each step is performed by said computer.

16. The method according to claim 14, wherein the process for generating the compressed data is performed by using the first dot pattern in the fourth step if it was determined that the representative value should not be used for generating the compressed data in the third step.

17. The method according to claim 14, wherein it is determined in the third step that the representative value obtained in the first step should be used for generating the compressed data if the mismatch value is smaller than the predetermined criterion value.

18. The method according to claim 14, wherein the fourth step includes performing the process for generating the compressed data by encoding the first dot pattern or the representative value.

19. A method performed in a computer for compressing image data having a gradation property, the method comprising the following steps:
   a first step for dividing the image data into predetermined areas, so as to determine a representative value of densities of pixels in each area;
   a second step for determining, for each area, a density of each pixel included in the area using the representative value of the area and an interpolation rule;
   a third step for comparing a first dot pattern that is an arrangement pattern of dots obtained by performing a pseudo gradation process on the image data using a dither pattern with a second dot pattern that is an arrangement pattern of dots obtained by performing a pseudo gradation process on a density of each pixel determined in the second step using the dither pattern so as to determine a mismatch value indicating a difference between the first dot pattern and the second dot pattern, and for determining a criterion value on the basis of the mismatch value;
   a fourth step for determining, on the basis of the mismatch value and the criterion value, whether or not to use the representative value obtained in the first step for a process for generating compressed data; and
   a fifth step for performing the process for generating the compressed data by using the representative value if it was determined that the representative value should be used for generating the compressed data, Wherein each step is performed by said computer.

20. A method performed in a computer for compressing image data having a gradation property, the method comprising the following steps:
   a first step for dividing the image data into predetermined areas, so as to determine a representative value of densities of pixels in each area;
   a second step for determining, for each area, a density of each pixel included in the area using the representative value of the area and an interpolation rule;
   a third step for comparing a first dot pattern that is an arrangement pattern of dots obtained by performing a pseudo gradation process on the image data using a dither pattern with a second dot pattern that is an arrangement pattern of dots obtained by performing a pseudo gradation process on a density of each pixel determined in the second step using the dither pattern so as to determine a mismatch value indicating a difference between the first dot pattern and the second dot pattern, and for determining a criterion value on the basis of the mismatch value;
   a fourth step for determining, on the basis of the mismatch value and the criterion value, for each area whether or not to use the representative value obtained in the first step for a process for generating compressed data; and
   a fifth step for performing the process for generating the compressed data by using the representative value of an area where it was determined to use the representative value for generating the compressed data, Wherein each step is performed by said computer.

* * * * *